US007426464B2

(12) United States Patent
Hui et al.

(10) Patent No.: US 7,426,464 B2
(45) Date of Patent: Sep. 16, 2008

(54) SIGNAL PROCESSING APPARATUS AND METHOD FOR REDUCING NOISE AND INTERFERENCE IN SPEECH COMMUNICATION AND SPEECH RECOGNITION

(75) Inventors: Siew Kok Hui, Singapore (SG); Kok Heng Loh, Singapore (SG); Boon Teck Pang, Singapore (SG); Khoon Seong Lim, Singapore (SG)

(73) Assignee: BITwave Pte Ltd., Singapore (SG)

( * ) Notice: Subject to any disclaimer, the term of this patent is extended or adjusted under 35 U.S.C. 154(b) by 766 days.

(21) Appl. No.: 10/891,120

(22) Filed: Jul. 15, 2004

(65) Prior Publication Data

US 2006/0015331 A1 Jan. 19, 2006

(51) Int. Cl.
*G10L 21/02* (2006.01)
*H04B 15/00* (2006.01)

(52) U.S. Cl. ...................................... 704/227; 381/94.1

(58) Field of Classification Search ....................... None
See application file for complete search history.

(56) References Cited

U.S. PATENT DOCUMENTS

2002/0198704 A1* 12/2002 Rajan et al. ................. 704/214

FOREIGN PATENT DOCUMENTS

WO WO03/036614 * 5/2003

* cited by examiner

*Primary Examiner*—David R. Hudspeth
*Assistant Examiner*—Samuel G Neway
(74) *Attorney, Agent, or Firm*—Lawrence Y D Ho & Associates Pte. Ltd.

(57) ABSTRACT

The present invention uses a method of processing signals in which signals received from an array of sensors are subject to system having a first adaptive filter arranged to enhance a target signal and a second adaptive filter arranged to suppress unwanted signals. The output of the second filter is converted into the frequency domain, and further digital processing is performed in that domain. The invention is further enhanced by incorporating a third adaptive filter in the system and a novel method for performing improved signal processing of audio signals that are suitable for speech communication.

7 Claims, 20 Drawing Sheets

405

420

SIGNAL PROCESSING APPARATUS AND METHOD FOR REDUCING NOISE AND INTERFERENCE IN SPEECH COMMUNICATION AND SPEECH RECOGNITION

FIELD OF THE INVENTION

The present invention relates to a system and method for speech communication and speech recognition. It further relates to signal processing methods which can be implemented in the system.

BACKGROUND OF THE INVENTION

The present applicant's PCT application PCT/SG99/00119, the disclosure of which is incorporated herein by reference in its entirety, proposes a method of processing signals in which signals received from an array of sensors are subject to a first adaptive filter arranged to enhance a target signal, followed by a second adaptive filter arranged to suppress unwanted signals. The output of the second filter is converted into the frequency domain, and further digital processing is performed in that domain.

The present invention seeks to further enhance the system by incorporating a third adaptive filter in the system and uses a novel method for performing improved signal processing of audio signals that are suitable for speech communication and speech recognition.

BRIEF DESCRIPTION OF THE DRAWINGS

An embodiment of the invention will now be described by way of example with reference to the accompanying drawings in which:

FIG. 6(*b*) represents a time delay estimator using an adaptive filter;

FIG. 6(*c*) shows the impulse response of the filter indicates a wave front from the boresight direction;

DETAILED DESCRIPTION OF THE INVENTION

Figure 1:
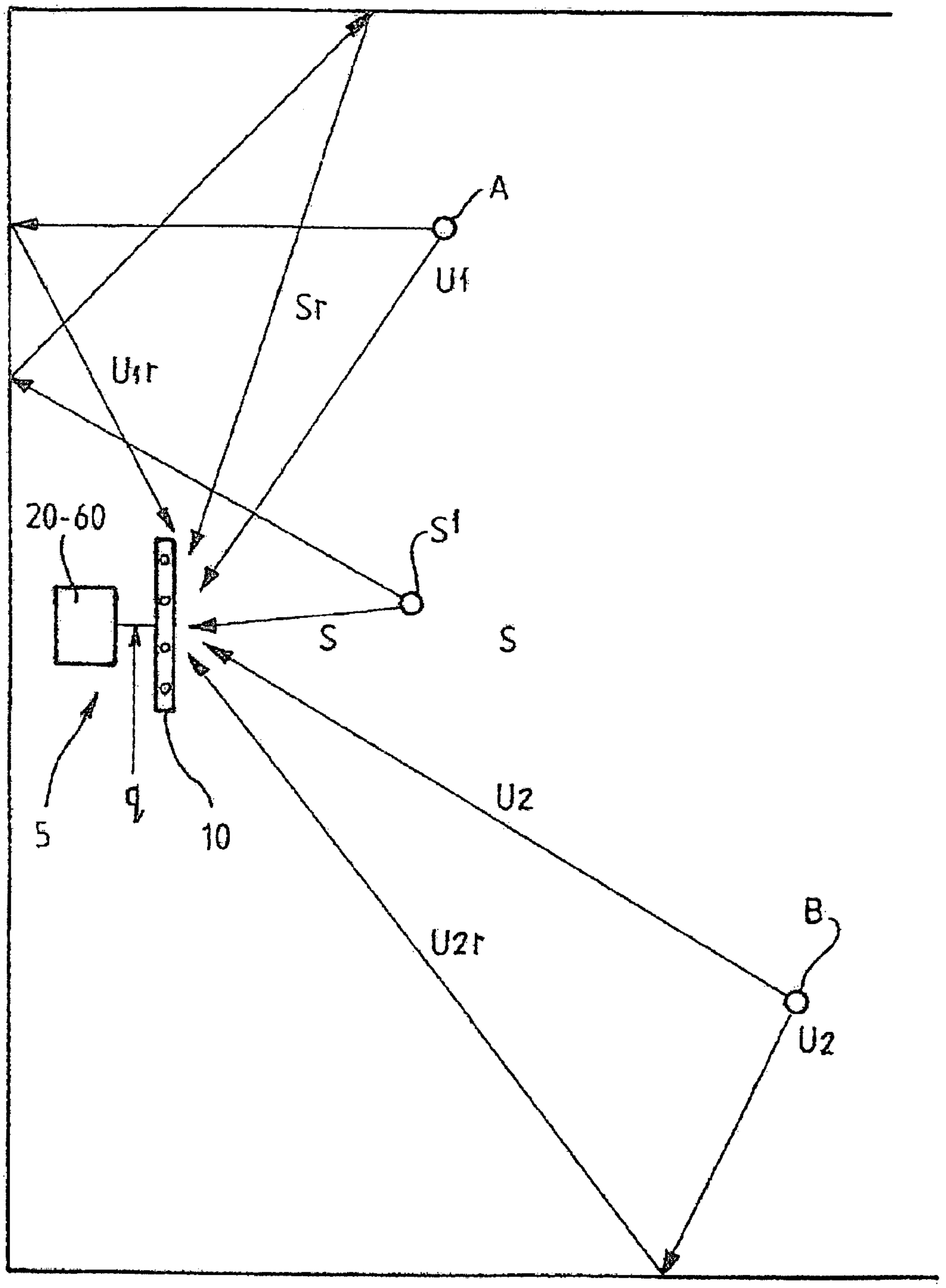
FIG. 1 illustrates a general scenario where the invention may be used.

FIG. 1 illustrates schematically the operation environment of a signal processing apparatus 5 of the described embodiment of the invention, shown in a simplified example of a room. A target sound signal "s" emitted from a source s' in a known direction impinging on a sensor array, such as a microphone array 10 of the apparatus 5, is coupled with other unwanted signals namely interference signals u1, u2 from other sources A, B, reflections of these signals u1*r*, u2*r* and the target signal's own reflected signal sr. These unwanted signals cause interference and degrade the quality of the target signal "s" as received by the sensor array. The actual number of unwanted signals depends on the number of sources and room geometry but only three reflected (echo) paths and three direct paths are illustrated for simplicity of explanation. The sensor array 10 is connected to processing circuitry 20-60 and there will be a noise input q associated with the circuitry which further degrades the target signal.

Figure 2:
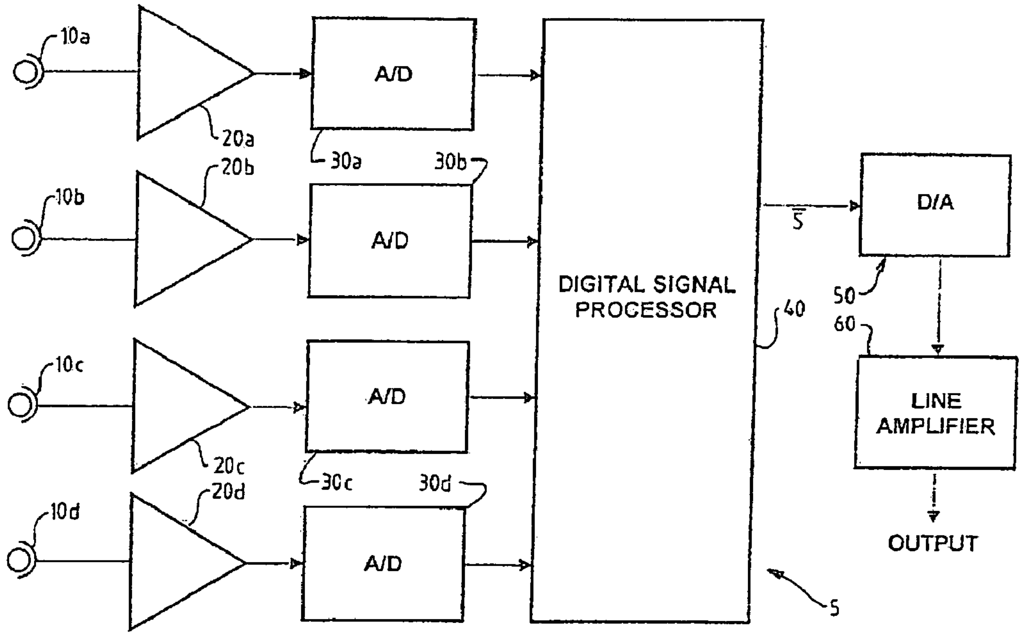
FIG. 2 is a schematic illustration of a general digital signal processing system embodying the present invention.

An embodiment of signal processing apparatus 5 is shown in FIG. 2. The apparatus observes the environment with an array of four sensors such as a plurality of microphones 10*a*-10*d*. Target and noise/interference sound signals are coupled when impinging on each of the sensors. The signal received by each of the sensors is amplified by an amplifier 20*a-d* and converted to a digital bitstream using an analogue to digital converter 30*a-d*. The bit Streams are feed in parallel to a digital signal processing means such as a digital signal processor 40 to be processed digitally. The digital signal processor 40 provides an output signal to a digital to an analogue converter 50 which is fed to a line amplifier 60 to provide the final analogue output.

Figure 3:
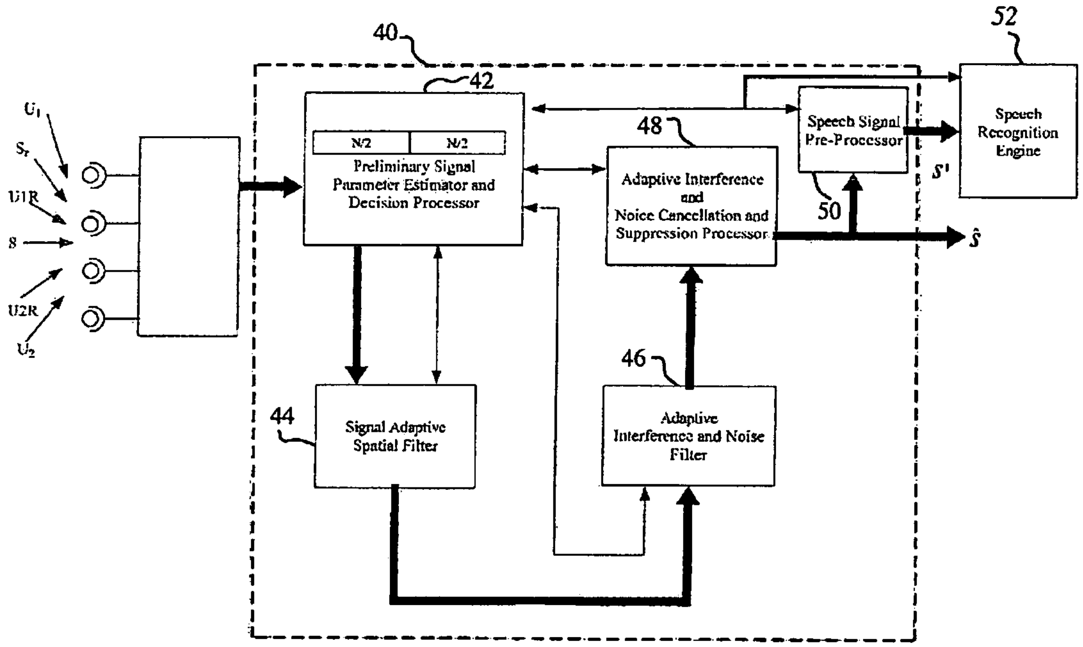
FIG. 3 is a system level block diagram of the described embodiment of FIG. 2.

FIG. 3 shows the major functional blocks of the digital signal processor in more detail. The multiple input coupled signals are received by the four-channel microphone array 10*a*-10*d*, each of which forms a signal channel, with channel 10*a* being the reference channel. The received signals are passed to a receiver front end which provides the functions of amplifiers 20 and analogue to digital converters 30 in a single custom chip. The four channel digitized output signals are fed in parallel to the digital signal processor 40. The digital signal processor 40 comprises five sub-processors. They are (a) a Preliminary Signal Parameters Estimator and Decision Processor 42, (b) a Signal Adaptive Filter 44 which may be referred to as a first adaptive filter, (c) an Adaptive Interference and Noise Filter 46 which may be referred to as a second adaptive filter, (d) an Adaptive Interference, Noise Cancellation and Suppression Processor 48 and (e) an Adaptive Speech Signal Pre-processor 50 which may be referred to as a third adaptive filter. The basic signal flow is from processor 42, to filter 44, to filter 46, to processor 48 and to filter 50. These connections being represented by thick arrows in FIG. 3. The filtered signal $\hat{S}$ and S' is output from filter 48 and processor 50 respectively. Decisions necessary for the operation of the processor 40 are generally made by processor 42 which receives information from filters 44, 46, processor 48 and filter 50, makes decisions on the basis of that information and sends instructions to filters 44, 46, processor 48 and filter 50, through connections represented by thin arrows in FIG. 3. The outputs S' and I of the processor 40 are transmitted to a Speech recognition engine 52.

It will be appreciated that the splitting of the processor 40 into five different modules 42, 44, 46, 48 and 50 is essentially notional and is mainly to assist understanding of the operation of the processor. The processor 40 would in reality be embodied as a single multi-function digital processor performing the functions described under control of a program with suitable memory and other peripherals. Furthermore, the operation of the speech recognition engine 52 could also be incorporated into the operation of the digital signal processor 40.

A flowchart illustrating the operation of the processors is shown in FIG. 4*a-g* and this will firstly be described generally. A more detailed explanation of aspects of the processor operation will then follow.

Figure 4A:
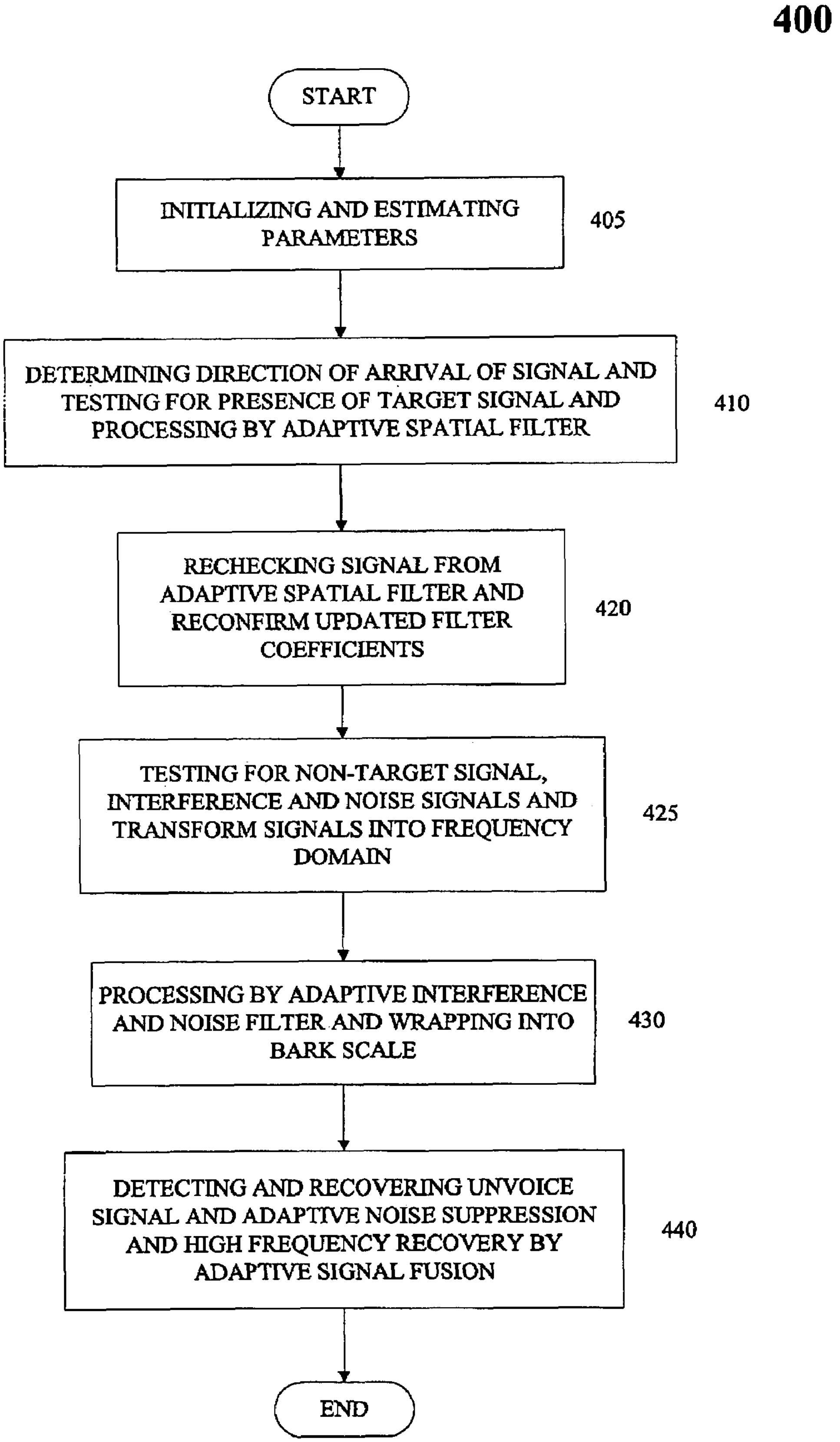
FIG. 4A to 4H are flow charts illustrating the operation of the embodiment of FIG. 3.

Referring to FIG. 4A, the method 400 of operation of the digital signal processor 40 starts with the step 405 of initializing and estimating parameters. Signals received from the microphone array 10*a-d* will be sampled and processed. Various energy and noise levels will also need to be estimated for further calculations in later steps.

Next, the step 410 is performed where direction of arrival of received signals at the microphone array 10*a-d* is determined and the presence of target signal is also tested for. Furthermore, in the same step 410, the received signals are processed by the Signal Adaptive Spatial Filter where an identified target signal is further enhanced.

Following which step 420 is carried out where the signal from the Signal Adaptive Spatial Filter is rechecked and filter coefficients reconfirmed.

In step 425, non-target signals, interference signals and noise signals are tested for and transformed into the frequency domain. In the same step, signals other than non-target signals, interference signals and noise signals are also transformed into the frequency domain.

The transformed signals then undergo step 430 where processing is performed by the Adaptive Interference and Noise Filter and the signals wrapped into Bark Scale.

After which step 440 is carried out where unvoice signals are detected and recovered and Adaptive Noise suppression is performed. In the same step, high frequency recovery by Adaptive Signal Fusion is also performed. The resulting signal is reconstructed in the time domain by an inverse wavelet transform.

Figure 4B:
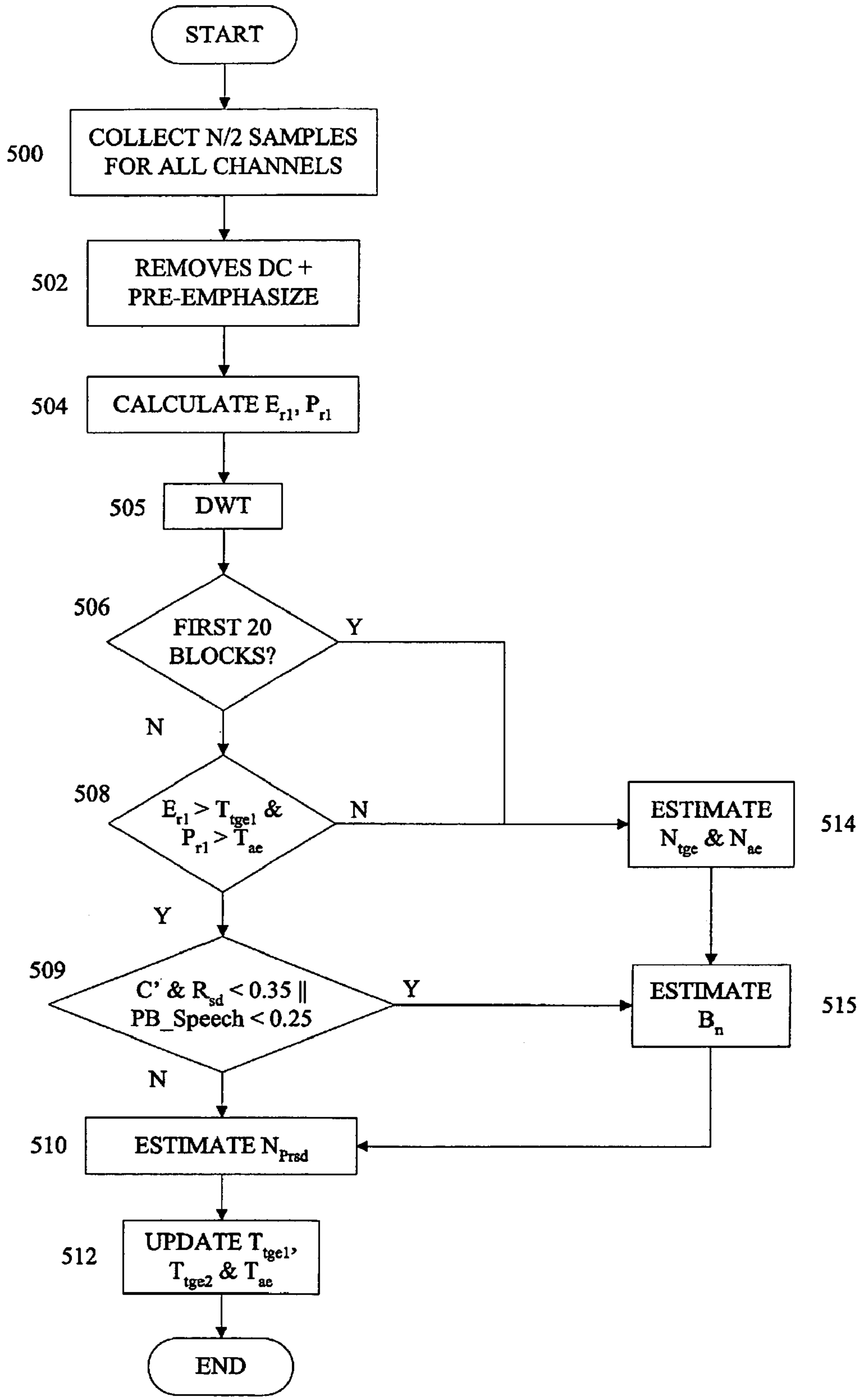

Referring to FIG. 4B, the step 405 further comprises and starts with step 500 where a block of N/2 new signal samples are collected for all channels. The front end 20*a-d*, 30 processes samples of the signals received from array 10*a-d* at a predetermined sampling frequency, for example 16 kHz. The processor 42 includes an input buffer 43 that can hold N such samples for each of the four channels such that upon completion of step 500, the buffer holds a block of N/2 new samples and a block of N/2 previous samples.

The processor 42 then removes any DC from the new samples and pre-emphasizes or whitens the samples at step 502.

Following this, the total non-linear energy of a signal sample $E_{r1}$ and the average power of the same signal sample $P_{r1}$ are calculated at step 504. The samples from the reference channel 10*a* are used for this purpose although any other channel could be used. The samples are then transformed to 2 sub-bands through a Discrete Wavelet Transform at step 505. These 2 sub-bands may then be used later in step 440 for high frequency recovery.

From step 504, the system follows a short initialization period at step 506 in which the first 20 blocks of N/2 samples of a signal after start-up are used to estimate the environment noise energy and power level $N_{tge}$ and $N_{ae}$ respectively. Then, the samples are also used to estimate a Bark Scale system noise $B_n$ at step 515. During this short period, an assumption is made that no target signals are present. $B_n$ is then moved to point F to be used for updating $B_y$.

At step 508, it is determined if the signal energy $E_{r1}$ is greater than the noise threshold, $T_{tge1}$ and the signal power $P_{r1}$ is greater than the noise threshold, $T_{ae}$. If not, a new set of environment noise, $N_{tge}$, $N_{ae}$ and $B_n$ will be estimated.

During abrupt change of environment noise of present of target signal, signal energy $E_{r1}$ and the signal power $P_{r1}$ might be greater than their respective noise threshold. To differentiate between these two conditions, a further test is carried out at step 509. If the signal is from C' (interference signal) and the energy ration $R_{sd}$ is below 0.35 or the probability of speech present PB_Speech is below 0.25, these mean there is no target signal present in the signal and it is either interference of environment noise. Hence, the signal will move to step 515 where the system noise $B_n$ is updated. Else, the signal passes to step 510.

At step 510 the signal to noise power ratio $P_{rsd}$ and the environment noise energy level are used to estimate the dynamic noise power level, $N_{Prsd}$. This dynamic noise power level will track the system SNR level closely and in turn used for updating $T_{Rsd}$ and $T_{Prsd}$. This close tracking of system SNR level will enable the system to detect target signal accurately during low SNR condition as show in FIG. 9.

Next, the updated noise energy level $N_{tge}$ is used to estimate the 2 noise energy thresholds, $T_{tge1}$ and $T_{tge2}$. The updated noise power level $N_{ae}$ is used to estimate the noise power threshold, $T_{ae}$ at stage 512.

Figure 5:
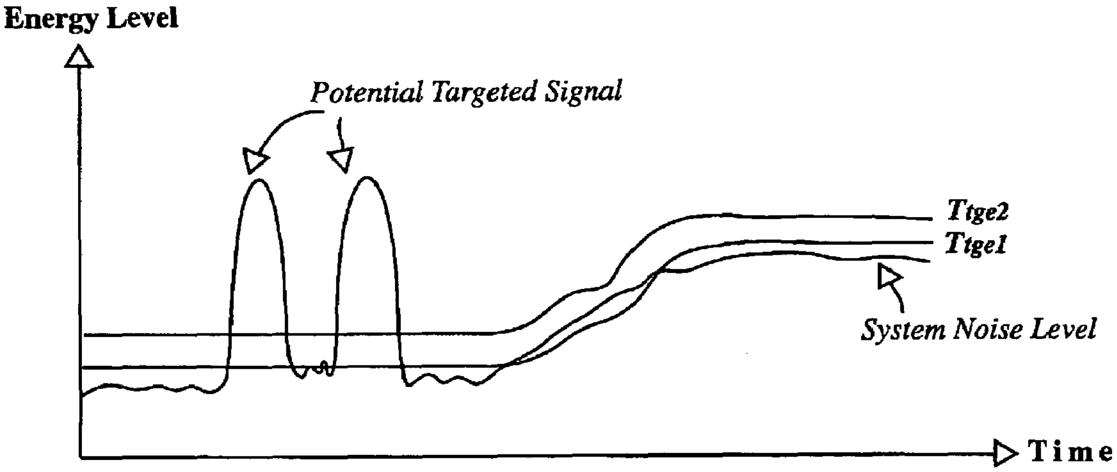
FIG. 5 illustrates a typical plot of non-linear energy of a channel and the established thresholds.

After this initialization period, $N_{tge}$, $N_{ae}$ and $B_n$ are updated when the update condition are fulfilled. As a result, the noise level threshold, $T_{tge1}$ and $T_{tge2}$ will be updated based on the previous $N_{tge}$, $N_{ae}$ and $B_n$. This case $T_{tge1}$ and $T_{tge2}$ will follow the environment noise level closely. This is illustrated in FIG. 5 in which a signal noise level rises gradually from an initial level to a new level which both thresholds are still follow.

The apparatus only wishes to process candidate target signals that impinge on the array 10 from a known direction normal to the array, hereinafter referred to as the boresight direction, or from a limited angular departure there from, in this embodiment plus or minus 15 degrees. Therefore, the next stage is to check for any signal arriving from this direction.

Figure 4C:
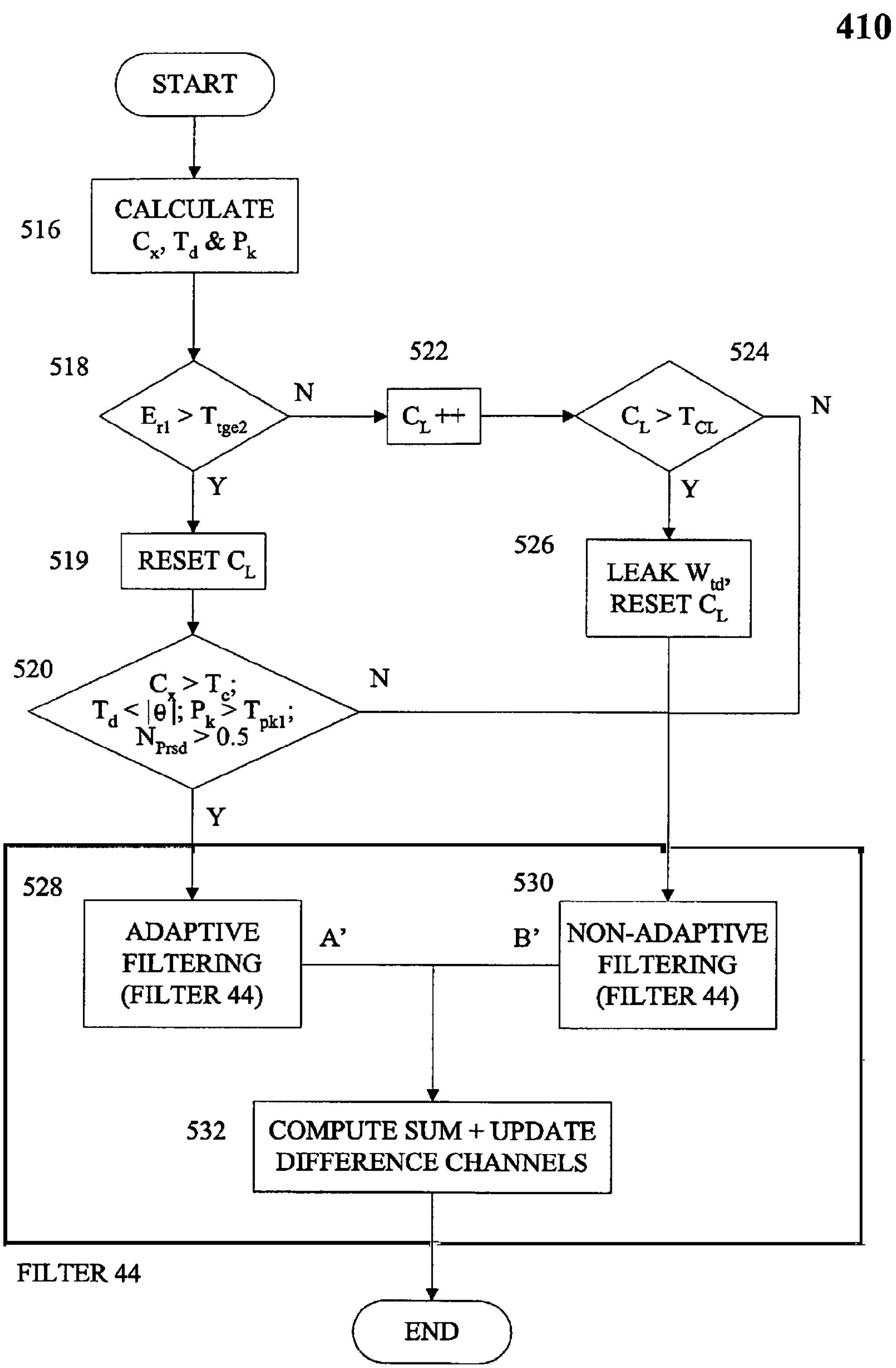

Referring to FIG. 4C, the step 410 further starts with step 516, where three coefficients are established, namely a correlation coefficient $C_x$, a correlation time delay $T_d$ and a filter coefficient peak ratio $P_k$. These three coefficients together provide an indication of the direction from which the target signal arrives from.

If at step 518, the estimated energy $E_{r1}$ in the reference channel 10*a* is found not to exceed the second threshold $T_{tge2}$, the target signal is considered not to be present and the method passes to step 530 for Non-Adaptive Filtering via steps 522-526 in which a counter $C_L$ is incremented at step 522. At step 524, $C_L$ is checked against a threshold $T_{CL}$. If the threshold is reached, block leaky is performed on the filter coefficient $W_{td}$ at step 526 and counter $C_L$ is also reset in the same step 526. This block leaky step improves the adaptation speed of the filter coefficient $W_{td}$ to the direction of fast changing target sources and environment. At step 524, if the threshold is not reached, the method passes to step 530.

At step 518, if the estimated energy $E_{r1}$ is larger than threshold $T_{tge2}$, counter $C_L$ is reset at step 519 and the signal will go through further verification at step 520 where four conditions are used to determine if the candidate target signal is an actual target signal. Firstly, the cross correlation coefficient $C_x$ must exceed a predetermined threshold $T_c$. Secondly, the size of the delay coefficient $T_d$ must be less than a value $\theta$ indicating that the signal has impinged on the array within a predetermined angular range. Thirdly the filter coefficient peak ratio $P_k$ must be more than a predetermined threshold $T_{Pk1}$ and fourthly the dynamic noise power level, $N_{Prsd}$ must be more that 0.5. If any one of these conditions is not met, the signal is not regarded as a target signal and the method passes to step 530 (non-target signal filtering). If all the conditions are met, the confirmed target signal undergoes step 528 where Adaptive Filtering (target signal filtering) by the Signal Adaptive Spatial Filter 44 takes place.

The Adaptive Spatial Filter 44 is instructed to perform adaptive filtering at step 528 and 532, in which the filter coefficients $W_{su}$ are adapted to provide a "target signal plus noise" signal in the reference channel and "noise only" signals in the remaining channels using the Least Mean Square (LMS) algorithm. The filter 44 output channel equivalent to the reference channel is for convenience referred to as the Sum Channel and the filter 44 output from the other channels, Difference Channels. The signal so processed will be, for convenience, referred to as A'.

If the signal is considered to be a noise or interference signal, the method passes to step 530 in which the signals are passed through filter 44 without the filter coefficients being adapted, to form the Sum and Difference channel signals. The signals so processed will be referred to for convenience as B'.

The effect of the filter 44 is to enhance the signal if this is identified as a target signal but not otherwise.

Figure 4D:
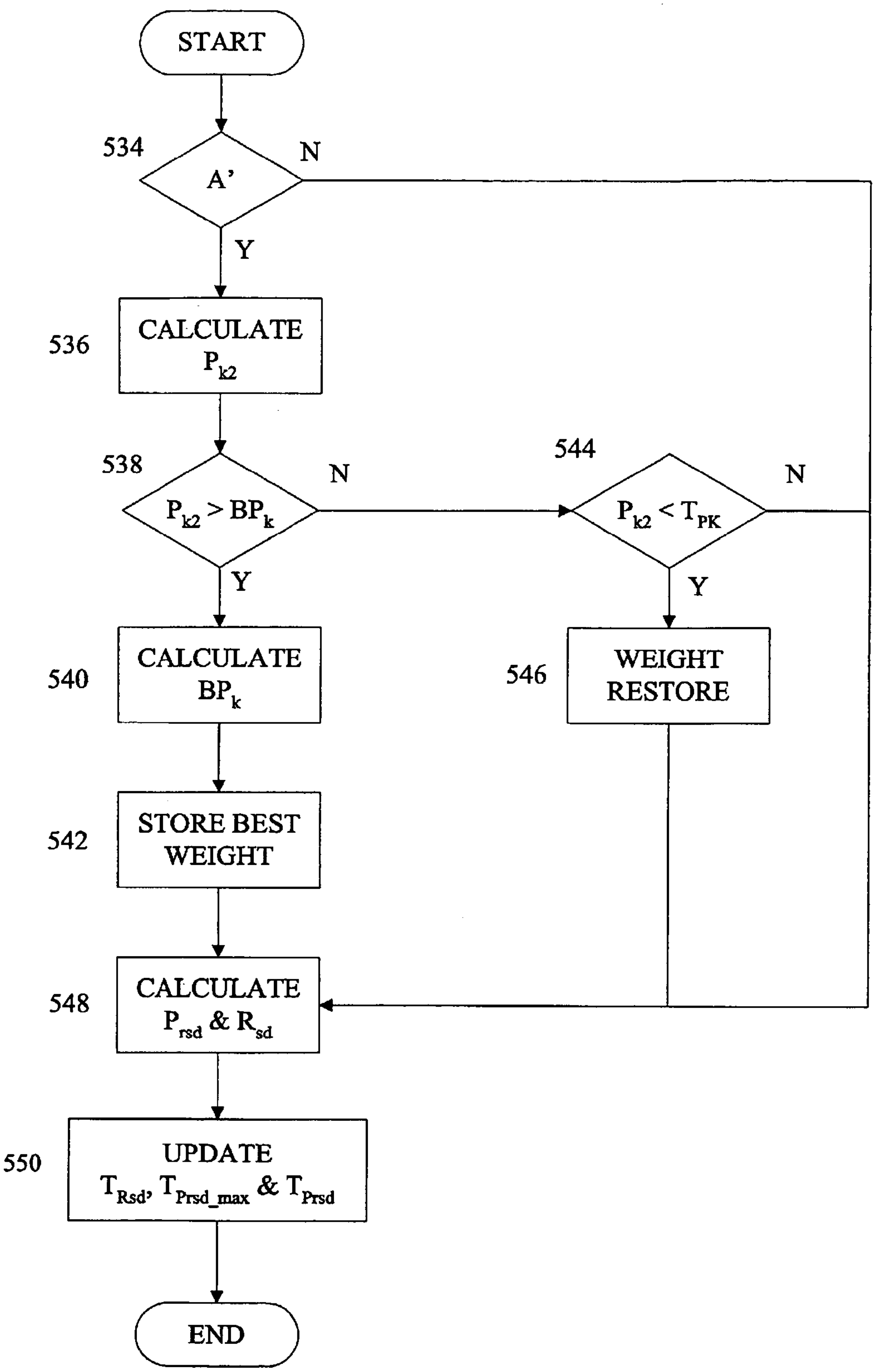

Referring to FIG. 4D, the step of 420 further starts at step 534, if the signal is A' signals from step 528 the method passes to step 536 where a new filter coefficient peak ratio $P_{k2}$ is calculated base on the filter coefficient $W_{su}$. This peak ratio is then compared with a best peak ratio $BP_k$ at step 538. If it is larger than best peak ratio, the value of best peak ratio is replaced by this new peak ratio $P_{k2}$ with a forgetting factor of 0.95 and all the filter coefficients $W_{su}$ are stored as the best filter coefficients at step 542. If it is not, the peak ratio $P_{k2}$ is again compared with a threshold $T_{Pk}$ at step 544. If the peak ratio is below the threshold, a wrong update on the filter coefficients is deemed to have occurred and the filter coefficients are restored with the previous stored best filter coefficients. If it is above the threshold, the method passes to step 548.

If the signal from step 528 is not A', the method passes from step 534 to step 548 where an energy ratio $R_{sd}$ and power ratio $P_{rsd}$ between the Sum Channel and the Difference Channels are estimated by processor 42. Following this, the adaptive noise power threshold $T_{Prsd}$, noise energy threshold $T_{Rsd}$ and the maximum dynamic noise power threshold $T_{Prsd\_max}$ are updated base on the calculated power ratio $P_{rsd}$ and $N_{Prsd}$.

Figure 4E:
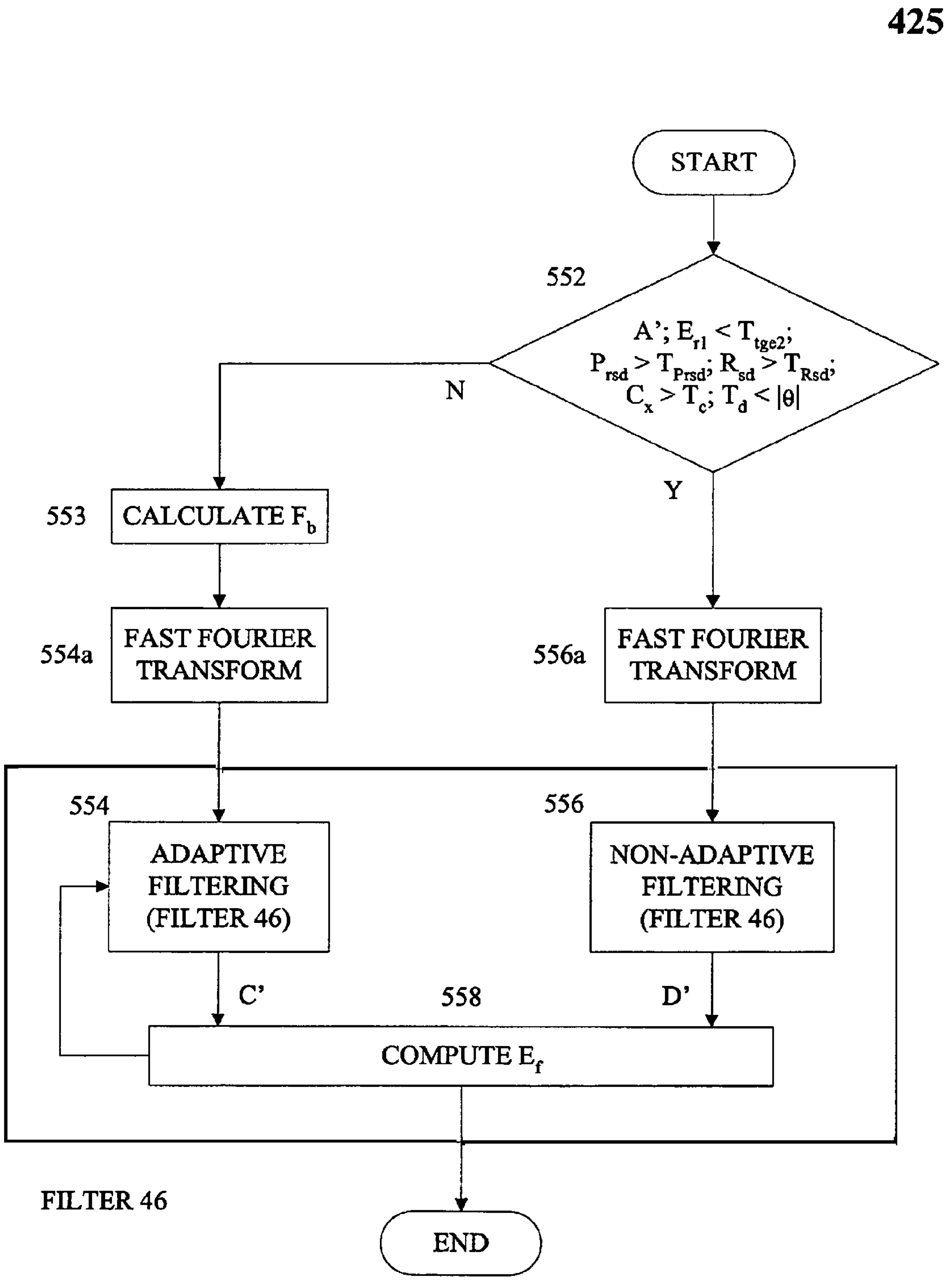

Referring to FIG. 4E, the step of 421 further starts with the step 552 to determine the presence noise or interference. At step 552, six conditions are tested. Firstly, whether the signals are A' signals from step 528. Secondly, whether the estimated energy $E_{r1}$ is less than the second threshold $T_{tge2}$, Thirdly, whether the cross correlation $C_x$ is higher than a threshold $T_c$. If it is higher than threshold, this may indicate that there is a target signal. Fourthly, whether the delay coefficient $T_d$ is less than a value θ, this may indicate that there is a target signal. Fifthly, whether the $R_{sd}$ is higher than threshold $T_{rsd}$. Sixthly, whether $P_{rsd}$ is higher than threshold $T_{Prsd}$. If the fifith and sixth condition are both higher than the respective thresholds, this may indicate that there has been some leakage of the target signal into the Difference channel, indicating the presence of a target signal after all.

Where any one of the six conditions are met, it is to be taken that target signals may well be present and the method then passes to step 556*a*.

Where all six conditions are not met, target signals are considered not present and the method passes to step 553 where a feedback factor, $F_b$ is calculated before passes to step 554*a*. This feedback factor is implemented to adjust the amount of feedback based on noise level to obtain a balance among convergent rate, system stability and performance at adaptive interference and noise filter 46.

Figure 13:
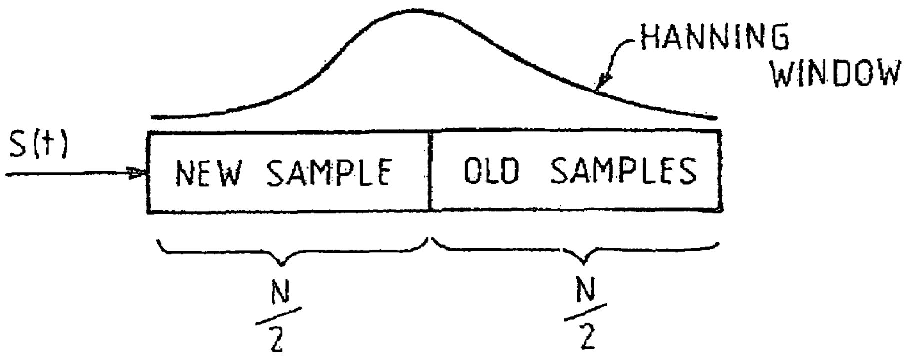
FIG. 13 shows and input signal buffer.
Figure 14:
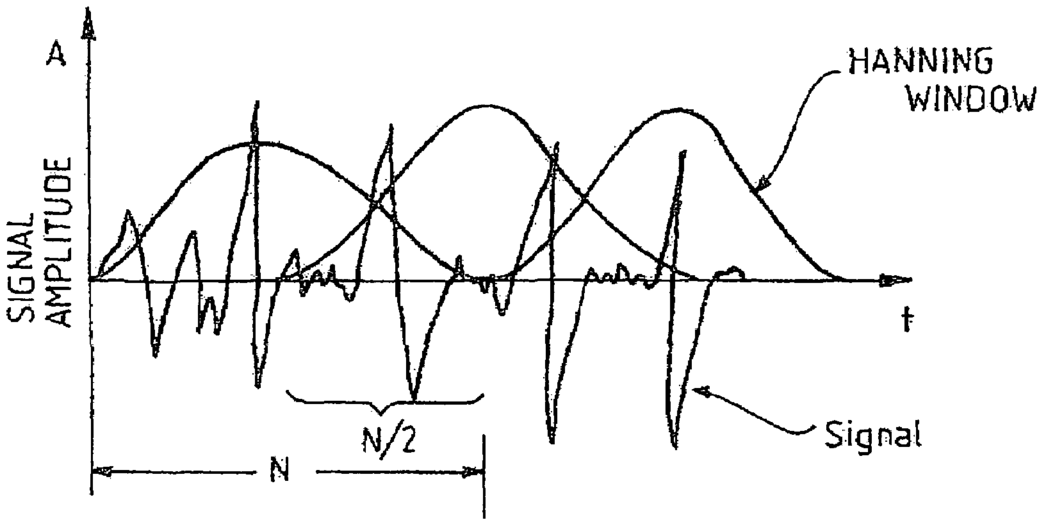
FIG. 14 shows the use of a Hanning Window on overlapping blocks of signals.

Before passed to step 556 or 554, these signals are collected for the new N/2 samples and the last N/2 samples from the previous block and a Hanning Window $H_n$ is applied to the collected samples as shown in FIG. 13 to form vectors $S_h$, $D_{1h}$, $D_{2h}$, and $D_{3h}$. This is an overlapping technique with overlapping vectors $S_h$, $D_{1h}$, $D_{2h}$, and $D_{3h}$ being formed from pass and present blocks of N/2 samples continuously. This is illustrated in FIG. 14. A Fast Fourier Transform is then performed on the vectors $S_h$, $D_{1h}$, $D_{2h}$, and $D_{3h}$ to transform the vectors into frequency domain equivalents $S_{cf}$, $D_{1f}$, $D_{2f}$, and $D_{3f}$ at step 554*a* and 556*a* respectively.

At step 554-558, the frequency domain signals $S_{cf}$, $D_{1f}$, $D_{2f}$, and $D_{3f}$ are processed by the Adaptive Interference and Noise Filter 46 using a novel frequency domain Least Mean Square (FLMS) algorithm, the purpose of which is to reduce the unwanted signals. The filter 46, at step 554 is instructed to perform adaptive filtering on the non-target signals with the intention of adapting the filter coefficients to reducing the unwanted signal in the Sum channel to some small error value $E_f$ at step 558. This computed $E_f$ is also fed back to step 554 to calculate the adaptation rate of weight updating μ of each frequency beam. This will effectively prevent signal cancellation cause by wrong updating of filter coefficients. The signals so processed will be referred to for convenience as C'.

In the alternative, at step 556, the target signals are fed to the filter 46 but this time, no adaptive filtering takes place, so the Sum and Difference signals pass through the filter.

The output signals from processor 46 are thus the Sum channel signal $S_{cf}$, error output signal $E_f$ at step 558 and filtered Difference signal $S_i$.

Figure 4F:
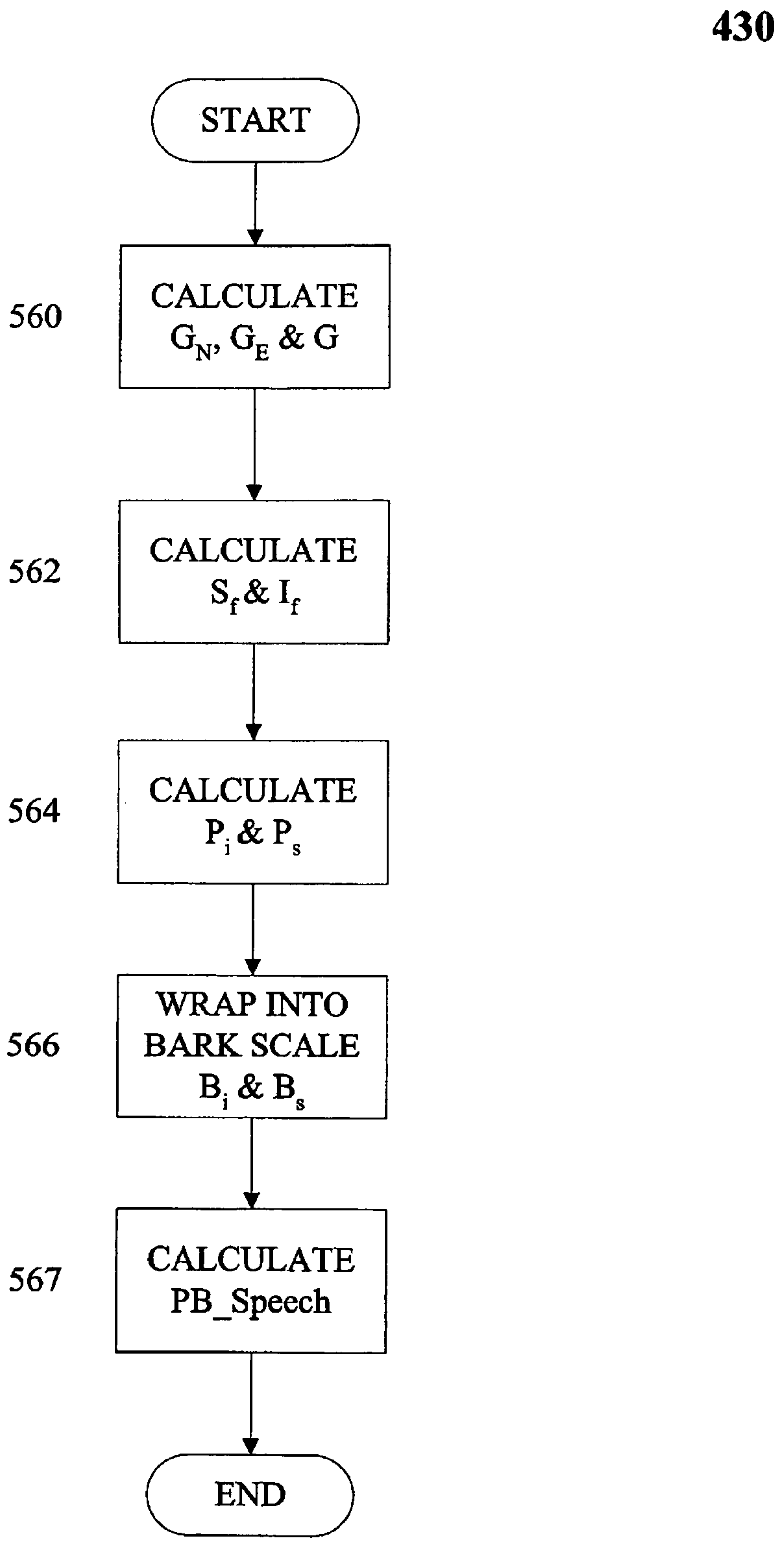

Referring to FIG. 4F, the step 430 further comprises and starts with calculating $G_N$, $G_E$ and G. Next, step 562 is performed where, output signals from processor 46: $S_{cf}$, $E_f$ and $S_i$ are combined by adaptive weighted average $G_N$, $G_E$ and G calculated at step 560 to produce a best combination signals $S_f$ and $I_f$ that optimize the signal quality and interference cancellation.

At step 564, a modified spectrum is calculated for the transformed signals to provide "pseudo" spectrum values $P_s$ and $P_i$. $P_s$ and $P_i$ are then warped into the same Bark Frequency Scale to provide Bark Frequency scaled values $B_s$ and $B_i$ at step 566. With these two values, a probability of speech present, PB_Speech is calculated at step 567.

Figure 4G:
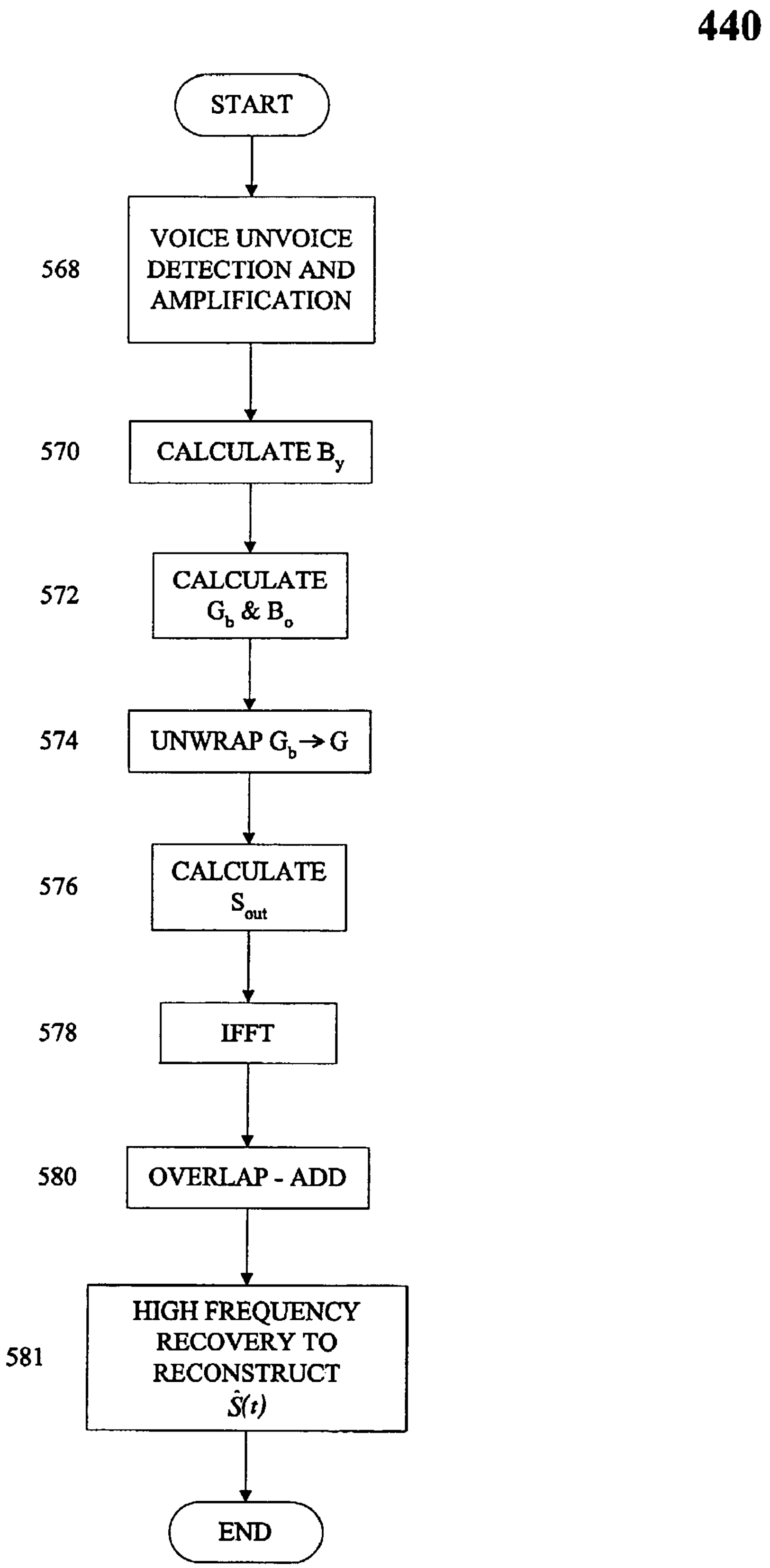

Referring to FIG. 4G, the step 440 further comprises and starts with step 568 where voice unvoice detection is performed on $B_s$ and $B_i$ from step 566 to reduce the signal cancellation on the unvoice signal.

A weighted combination $B_y$ of $B_n$ (through path E) and $B_i$ is then made at step 570 and this is combined with $B_s$ to compute the Bark Scale non-linear gain $G_b$ at step 572.

$G_b$ is then unwrapped to the normal frequency domain to provide a gain value G at step 574 and this is then used at step 576 to compute an output spectrum $S_{out}$ using the signal spectrum $S_f$ from step 562. This gain-adjusted spectrum suppresses the interference signals, the ambient noise and system noise.

An inverse FFT is then performed on the spectrum $S_{out}$ at step 578 and the time domain signal is then reconstructed from the overlapping signals using the overlap add procedure at step 580. This time domain signal if subject to further high frequency recovery at step 581 where the signal are transform to two sub-bands at wavelet domain and multiplex with a reference signal. This multiplex signal is then reconstructed to time domain output signal, $\hat{S}_t$ by an inverse wavelet transform using the 2 sub-bands from the Discrete Wavelet Transform at step 505.

The method at this stage had essentially completed the noise suppression of the signals received earlier from the microphone array 10*a-d*. The resulting recovered $\hat{S}_t$ signal may be used readily for voice communication free from noise and interference in a variety of communication system and devices.

However, for this $\hat{S}_t$ signal to be further used for Speech Recognition purposes, further processing is required to assist the Speech Recognition Engine 52 from triggering when non-speech signals are received.

The $\hat{S}_t$ signal is further sent to the Speech Signal Pre-Processor 50 where an additional step 450 is performed for the pre-processing of the speech signal.

Figure 4H:
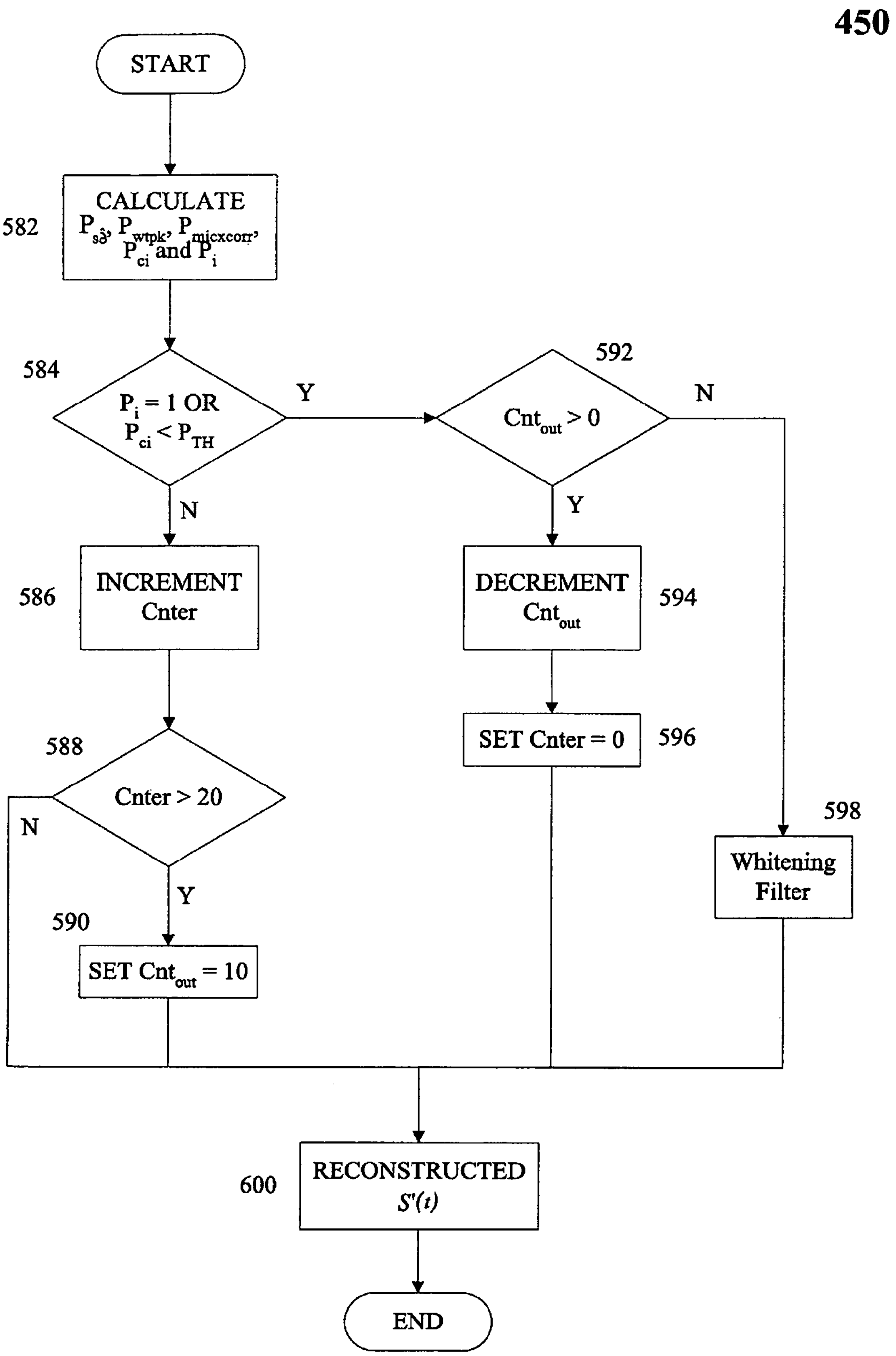

Referring to FIG. 4H, the step 450 further comprises step 582-598, where output signal $\hat{S}_t$ from Adaptive Interference and Noise Cancellation and Suppression Processor 48 was subjected to further processing before feeding to the Speech Recognition Engine 52 to reduce the frequency of false triggering. According to the value of continuous interference parameter $P_{ci}$ and the status of continuous intermittent status parameter $P_i$, which were derived based on information gathered from the various stages of the microphone array processing algorithm, and counter $Cnt_{out}$, a decision is made on whether the signal $\hat{S}_t$ should be processed by a whitening filter.

Value of continuous interference threshold parameter $P_{TH}$, $P_{ci}$ and the status of $P_i$ are computed at step 582. If the signal current being processed contained the desired speech signal, program flows through the sequential steps 584, 586, 588, 590 or 584,586, 588 depending on the value of counter Cnter which is verified at step 588. Both of these sequences will not result in any modification to the signal $\hat{S}_t$. Program flows through sequential steps 584, 592, 596 otherwise. The use of counter $Cnt_{out}$ and Cnter has been a strategy adopted to protect the ending segment of desired speech signal. During this ending segment of speech, which is of small magnitude, parameters $P_{ci}$ and $P_i$ tend to be unreliable. This situation is especially true under loud interferences from the sides of the array. The counter Cnter is used to count the number of consecutive buffers which return false for the status of the Boolean expression $P_{ci}<P_{TH}$ OR $P_i=1$ at step 584, a condition that is encountered in the presence of a desired speech segment. When Cnter reaches a pre-specified value, which is equal to 20 in this embodiment, it indicates that the algorithm is potentially processing a desired speech signal segment currently, the algorithm then sets the counter $Cnt_{out}$ equal to a fixed value which correspond to the number of buffers to be output in the first instance when status of the Boolean expression $P_{ci}<P_{TH}$ OR $P_i=1$ returns true.

At step 592, if the counter $Cnt_{out}$ is greater than 0, condition indicating that the current buffer is likely to be the ending segment of a desired speech signal, $\hat{S}_t$ will bypass the whitening filter at step 596 and proceeds to step 594 that decrements counter $Cnt_{out}$ by 1 and as well as resetting counter Cnter to 0. Again, this program sequence does not result in any modification to the signal $\hat{S}_t$.

Program flows to step 596 if the counter $Cnt_{out}$ is less than or equal 0 at step 592, this flow sequence, which only occur when the current buffer contains neither the desired speech signal nor the ending segment, results in the whitening of the signal $\hat{S}_t$ by the whitening filter and produce a clean output signal S'.

Besides providing the Speech Recognition Engine 52 with a processed signal S', the system also provides a set of useful information indicated as I on FIG. 3. This set of information may include any one or more of:

1. Probability of Speech Present, PB_Speech (step 567)
2. The direction of speech signal, $T_d$ (step 516)
3. Signal Energy, $E_{r1}$ (step 504)
4. Noise threshold, $T_{tge1}$ & $T_{tge2}$ (step 512)
5. Estimated SINR (signal to interference noise ratio) and SNR (signal to noise ratio), and $R_{sd}$ (step 548)
6. Spectrum of processed speech signal, $S_{out}$ (step 576)
7. Potential speech start and end point
8. Interference signal spectrum, $I_f$ (step 562).

Major steps in the above described flowchart will now be described in more detail.

Non-Linear Energy Estimation (Steps 504)

The processor 42 estimates the energy output from a reference channel. In the four channel example described, channel 10*a* is used as the reference channel.

N/2 samples of the digitized signal are buffered into a shift register to form a signal vector of the following form:

$$X_r = \begin{bmatrix} x_r \\ x_r(2) \\ \vdots \\ x_r(J) \end{bmatrix} \qquad \text{C.1}$$

Where J=N/2. The size of the vector depends on the resolution requirement. In the preferred embodiment, J=128 samples.

The nonlinear energy of the vector is then estimated using the following equation:

$$E_{rl} = \frac{1}{J-2}\sum_{i=1}^{J-2} x(i)^2 - x(i+1)\,x(i-1) \qquad \text{A.1}$$

Noise Level Estimation and Threshold Updating (Steps 514.515)

This Noise Level Estimation function is able to distinguish between speech target signal and environment noise signal. In this case the environment noise level can be track more closely and this means than the user can use the embodiment in all environments, especially noisy environments (car, supermarket, etc).

During system initialization, this Noise Level $N_{tge}$ and $N_{ae}$ are first established and the noise level threshold, $T_{tge1}$ and $T_{ae}$ are then updated. $N_{tge}$ and $N_{ae}$ will continue to be updated when there is no target speech signal and the noise signal power $E_{r1}$ and $P_{r1}$ is less than the noise level threshold, $T_{tge1}$ and $T_{ae}$ respectively.

A Bark Spectrum of the system noise and environment noise is also similarly computed and is denoted as $B_n$.

The noise level $N_{tge}$, $N_{ae}$ and $B_n$ are updated as follows:

If the signal energy of the reference signal is less than threshold, $T_{tge1}$ and the average power of the reference signal is less than threshold, $T_{ae}$ or during the first 20 cycles of system initialization then, if the signal energy of the reference signal is less than the noise level $N_{tge}$, $$\alpha_1=0.98$$

Else $$\alpha_1=0.9$$

$$N_{tge}=\alpha_1*N_{tge}+(1-\alpha_1)*E_{r1}$$

$$N_{ae}=\alpha_1*N_{ae}+(1-\alpha_1)*P_{r1}$$

$$B_n=\alpha_1*B_n+(1-\alpha_1)*B_s$$

Where $E_{r1}$ is the signal energy of the reference signal and $P_{r1}$ is the average power of the reference signal.

Once the noise energy, $N_{tge}$ and $N_{ae}$ are obtained, the three noise threshold are established as follows:

$$T_{tge1}=\beta_1*N_{tge}$$

$$T_{tge2}=\beta_2*N_{tge}$$

$$T_{ae}=\beta_3*N_{ae}$$

In this embodiment, $\beta_1=1.175$, $\beta_2=1.425$ and $\beta_3=1.3$ have been found to give good results.

If there is an abrupt change in environment noise, the signal energy of the reference signal might be higher than threshold, $T_{tge1}$ and causes the $B_n$ not updated. To overcome this, a condition is checked to make sure the estimated noise spectrum $B_n$ is updated during this condition and whenever there is no target signal present. The updating condition is as follows:

If C' and Rsd<0.35 or PB_Speech<0.25 then, $$\alpha_1=0.98$$

$$B_n=\alpha_1*B_n+(1-\alpha_1)*B_s$$

Dynamic Noise Power Level Updating $N_{Prsd}$

This dynamic noise power level, $N_{Prsd}$ is estimated based on the signal power ratio Prsd and the environment noise level. It will then be used to update the dynamic noise power threshold, for this case $T_{Rsd}$, $T_{Prsd\_max}$ and $T_{Prsd}$. It is used to track closely the dynamic changing of the signal power ratio, $P_{rsd}$ during no target signal present. A target signal is detected when the signal power ratio, $P_{rsd}$ is higher than the dynamic noise power threshold, $T_{Prsd}$.

Figure 9:
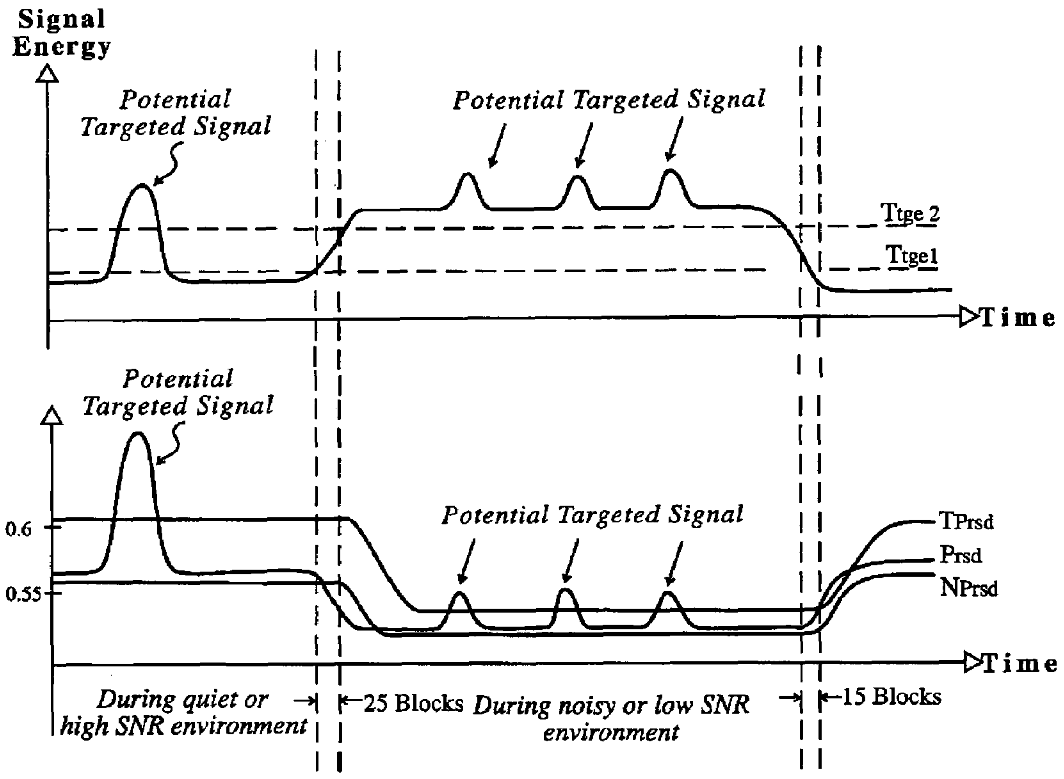
FIG. 9 illustrates a typical plot of signal power ratio and the established of dynamic noise thresholds.

During noisy environment or low SNR condition, the signal power ratio, $P_{rsd}$ will decrease to a lower level. In this case the dynamic noise power level, $N_{Prsd}$ will follow the signal power ratio to that lower level. The dynamic noise power threshold, $T_{Prsd}$ will also be set at a lower threshold. This will ensure any low SNR target signal to be detected because the signal power ratio, $P_{rsd}$ of such target signal will also be lower. This is illustrated in FIG. 9.

This dynamic noise power level, $N_{Prsd}$ is updated base on the following conditions: If the reference channel signal energy is less than $T_{tge1}$ and $T_{tge2}$ and power ratio is greater than 0.55 for 15 consecutive processing blocks, $$N_{Prsd}=\alpha_1*N_{Prsd}+(1-\alpha_1)*\beta_1$$

Else if the reference channel signal energy is greater than $T_{tge1}$ and power ratio is less than 0.6 for 25 consecutive processing blocks, $$N_{Prsd}=\alpha_2*N_{Prsd}+(1-\alpha_2)*T_{Prsd\_max}$$

In this embodiment, $\alpha_1=0.7$, $\alpha_2=0.85$ and $\beta_1=1.2$ have been found to give good results.

Time Delay Estimation $T_d$ (Step 516)

Figure 6A:
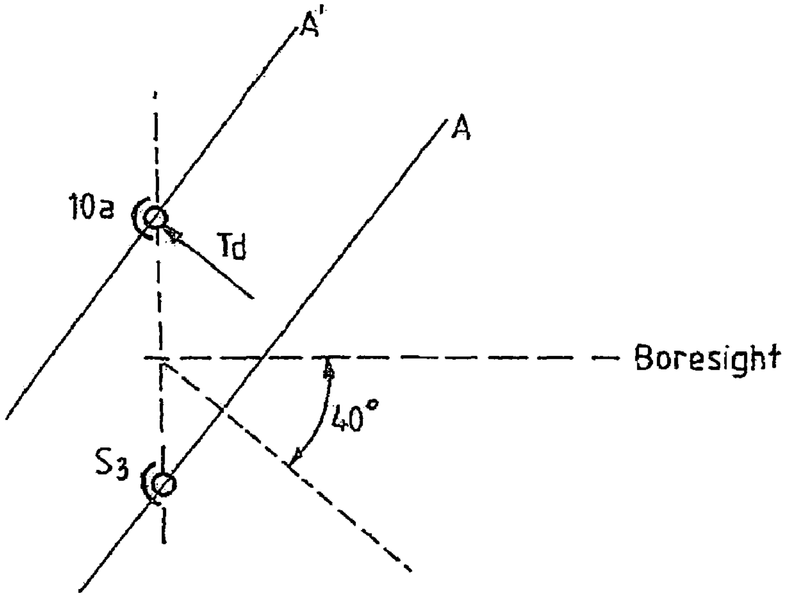
FIG. 6(*a*) illustrates a wave front arriving from 40 degree off-boresight direction.

FIG. 6A illustrates a single wave front impinging on the sensor array. The wave front impinges on sensor 10*d* first (A as shown) and at a later time impinges on sensor 10*a* (A' as shown), after a time delay $t_d$. This is because the signal originates at an angle of 40 degrees from the boresight direction. If the signal originated from the boresight direction, the time delay $t_d$ will have been zero ideally.

Figure 6B:
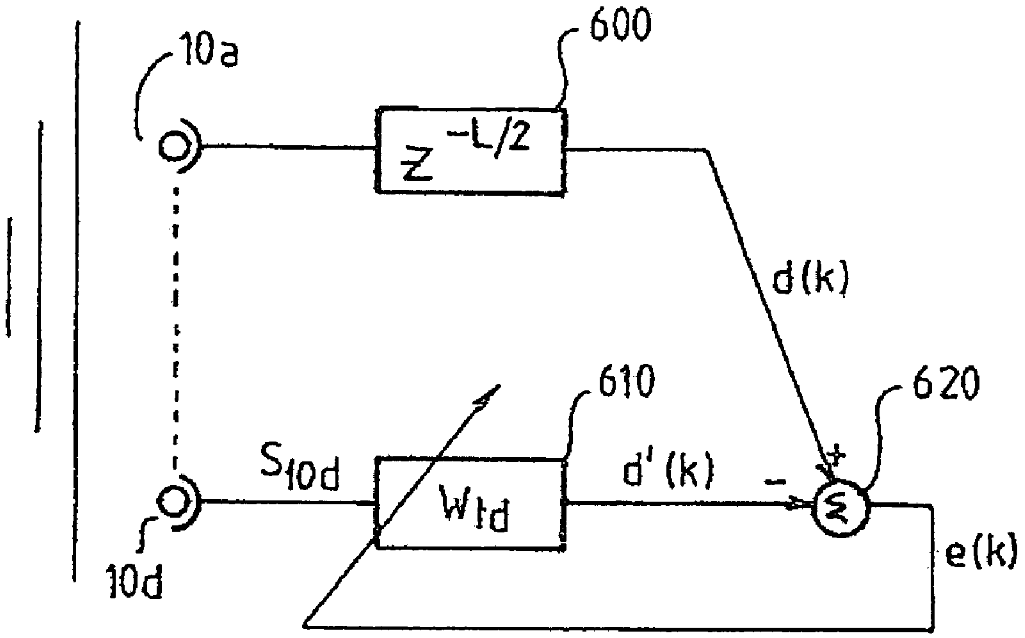

Time delay estimation of performed using a tapped delay line time delay estimator included in the processor 42 which is shown in FIG. 6B. The filter has a delay element 600, having a delay $Z^{-L/2}$, connected to the reference channel 10*a* and a tapped delay line filter 610 having a filter coefficient $W_{td}$ connected to channel 10*d*. Delay element 600 provides a delay equal to half of that of the tapped delay line filter 610. The outputs from the delay element is d(k) and from filter 610 is d'(k). The Difference of these outputs is taken at element 620 providing an error signal e(k) (where k is a time index used for ease of illustration). The error is fed back to the filter 610. The Least Mean Squares (LMS) algorithm is used to adapt the filter coefficient $W_{td}$ as follows:

$$W_{td}(k+1)=W_{td}(k)+2\mu_{td}S_{10d}(k)e(k) \quad \text{B.1}$$

$$W_{td}(k+1)=\begin{bmatrix} W_{td}^0(k+1) \\ W_{td}^1(k+1) \\ \vdots \\ W_{td}^{LO}(k+1) \end{bmatrix} \quad \text{B.2}$$

$$S_{10d}(k)=\begin{bmatrix} S_{10d}^0(k) \\ S_{10d}^1(k) \\ \vdots \\ S_{10d}^{LO}(k) \end{bmatrix} \quad \text{B.3}$$

$$e(k)=d(k)-d'(k) \quad \text{B.4}$$

$$d'(k)=W_{td}(k)^T\cdot S_{10d}(k) \quad \text{B.5}$$

$$\mu_{td}=\frac{\beta_{td}}{\|S_{10d}(k)\|} \quad \text{B.6}$$

where $\beta_{td}$ is a user selected convergence factor $0<\beta_{td}\leqq 2$, $\|\ \|$ denoted the norm of a vector, k is a time index, $L_o$ is the filter length.

Figure 6C:
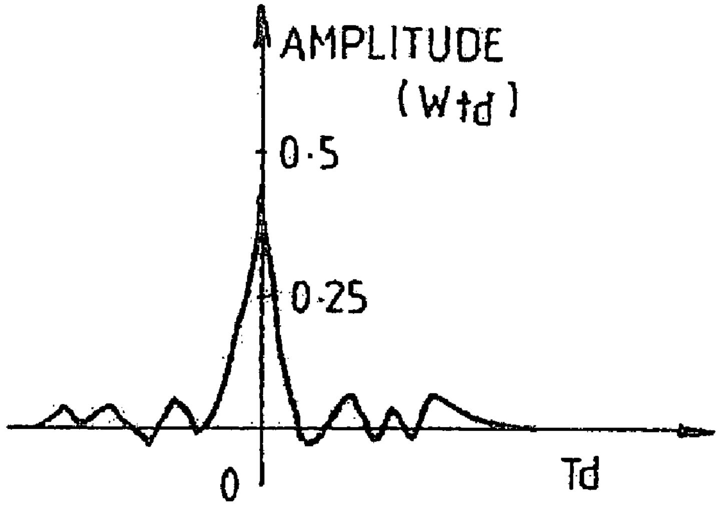

The impulse response of the tapped delay line filter 620 at the end of the adaptation is shown in FIG. 6C. The impulse response is measured and the position of the peak or the maximum value of the impulse response relative to origin O gives the time delay $T_d$ between the two sensors which is also the angle of arrival of the signal. In the case shown, the peak lies at the center indicating that the signal comes from the boresight direction ($T_d=0$). The threshold θ at step 506 is selected depending upon the assumed possible degree of departure from the boresight direction from which the target signal might come. In this embodiment, θ is equivalent to ±15°.

Normalized Cross Correlation Estimation $C_x$ (Step 516)

The normalized cross correlation between the reference channel 10*a* and the most distant channel 10*d* is calculated as follows:

Samples of the signals from the reference channel 10*a* and channel 10*d* are buffered into shift registers X and Y where X is of length J samples and Y is of length K samples, where J>K, to form two independent vectors $X_r$ and $Y_r$:

$$X_r = \begin{bmatrix} x_r \\ x_r(2) \\ \vdots \\ x_r(J) \end{bmatrix} \quad \text{C.1}$$

$$Y_r = \begin{bmatrix} y_r \\ y_r(2) \\ \vdots \\ y_r(K) \end{bmatrix} \quad \text{C.2}$$

A time delay between the signals is assumed, and to capture this Difference, J is made greater than K. The Difference is selected based on angle of interest. The normalized cross-correlation is then calculated as follows:

$$C_x(l) = \frac{Y_r^T * X_{rl}}{\|Y_r\| * \|X_{rl}\|} \quad \text{C.3}$$

$$\text{Where} \ldots X_{rl} = \begin{bmatrix} X_r \\ X_r(l+1) \\ \vdots \\ x_r(K+l-1) \end{bmatrix} \quad \text{C.4}$$

Where $^T$ represents the transpose of the vector and $\|\ \|$ represent the norm of the vector and l is the correlation lag. l is selected to span the delay of interest. For a sampling frequency of 16 kHz and spacing between sensors 10*a*, 10*d* of 18 cm, the lag l is selected to be five samples for an angle of interest of 15°.

The threshold $T_c$ is determined empirically. $T_c$=0.65 is used in this embodiment.

Filter Coefficient Peak Ratio, $P_k$ with Scanning (Step 516)

Figure 7:
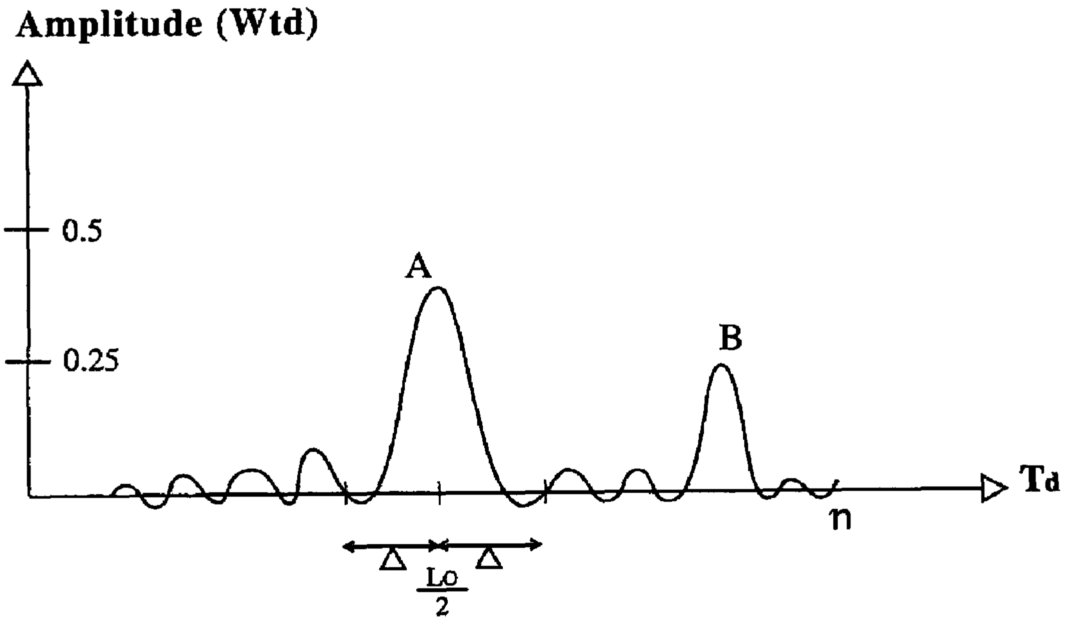
FIG. 7 shows the response of time delay estimator of the filter indicates an interference signal together with a wave front from the boresight direction.

The impulse response of the tapped delay line filter with filter coefficients $W_{td}$ at the end of the adaptation with the presence of both signal and interference sources is shown in FIG. 7. The filter coefficient $W_{td}$ is as follows:

$$W_{td}(k) = \begin{bmatrix} W_{td}^0(k) \\ W_{td}^1(k) \\ \vdots \\ W_{td}^{L0}(k) \end{bmatrix}$$

With the presence of both signal and interference sources, there will be more than one peak at the tapped delay line filter coefficient. The $P_k$ ratio is calculated as follows:

$$A = \text{Max}W_{td}^n \quad \text{where } \frac{L0}{2} - \Delta \le n \le \frac{L0}{2} + \Delta$$

$$B = MaxpeakW_{td}^n \quad \text{where } 0 \le n < \frac{L0}{2} - \Delta,\ \frac{L0}{2} + \Delta < n$$

$$P_k = \frac{A}{A+B}$$

Δ is calculated base on the threshold θ at step 530. In this embodiment, with θ equal to ±15°, Δ is equivalent to 2. A low $P_k$ ratio indicates the present of strong interference signals over the target signal and a high $P_k$ ratio shows high target signal to interference ratio.

Figure 8:
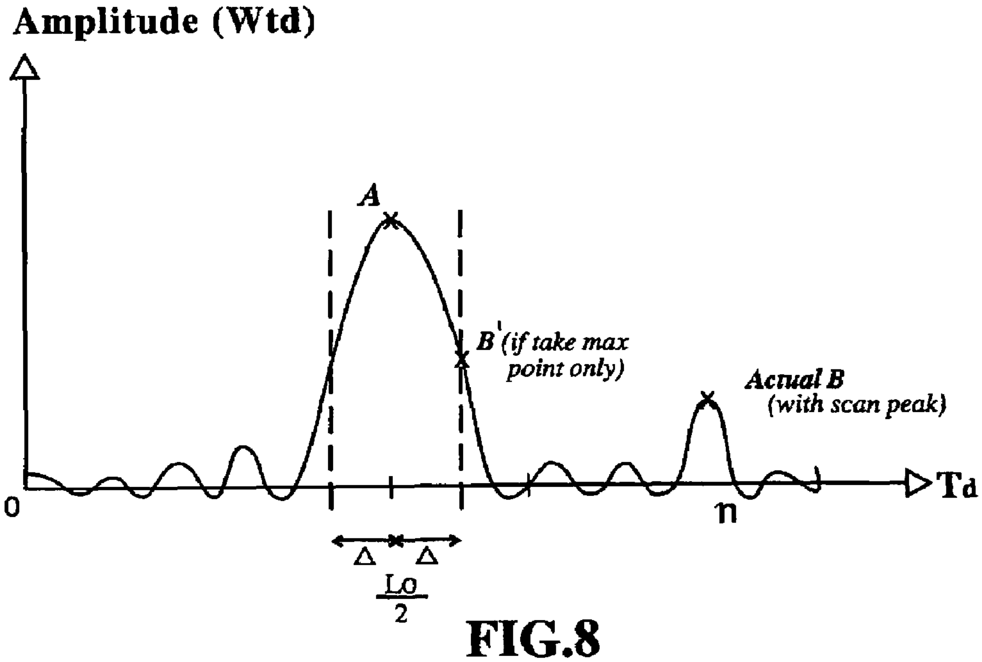
FIG. 8 shows the effect of scan maximum function in the response of time delay estimator of the filter

Note that the value of B is obtained by scanning the maximum peak point at the two boundaries instead of taking the maximum point. This is to prevent a wrong estimation of $P_k$ ratio when the center peak is broad and the high edge at the boundary B' being misinterpreted as the value of B as shown in FIG. 8.

Block Leaky LMS for Time Delay Estimation (Step 522-526)

In the time delay estimation LMS algorithm, a modified leaky form is used. This is simply implemented by:

$W_{td}$=α$W_{td}$ (where α=forgetting_factor~=0.98)

This leaky form has the property of adapting faster to the direction of fast changing sources and environment.

Adaptive Spatial Filter 44 (Steps 528-532)

Figure 10:
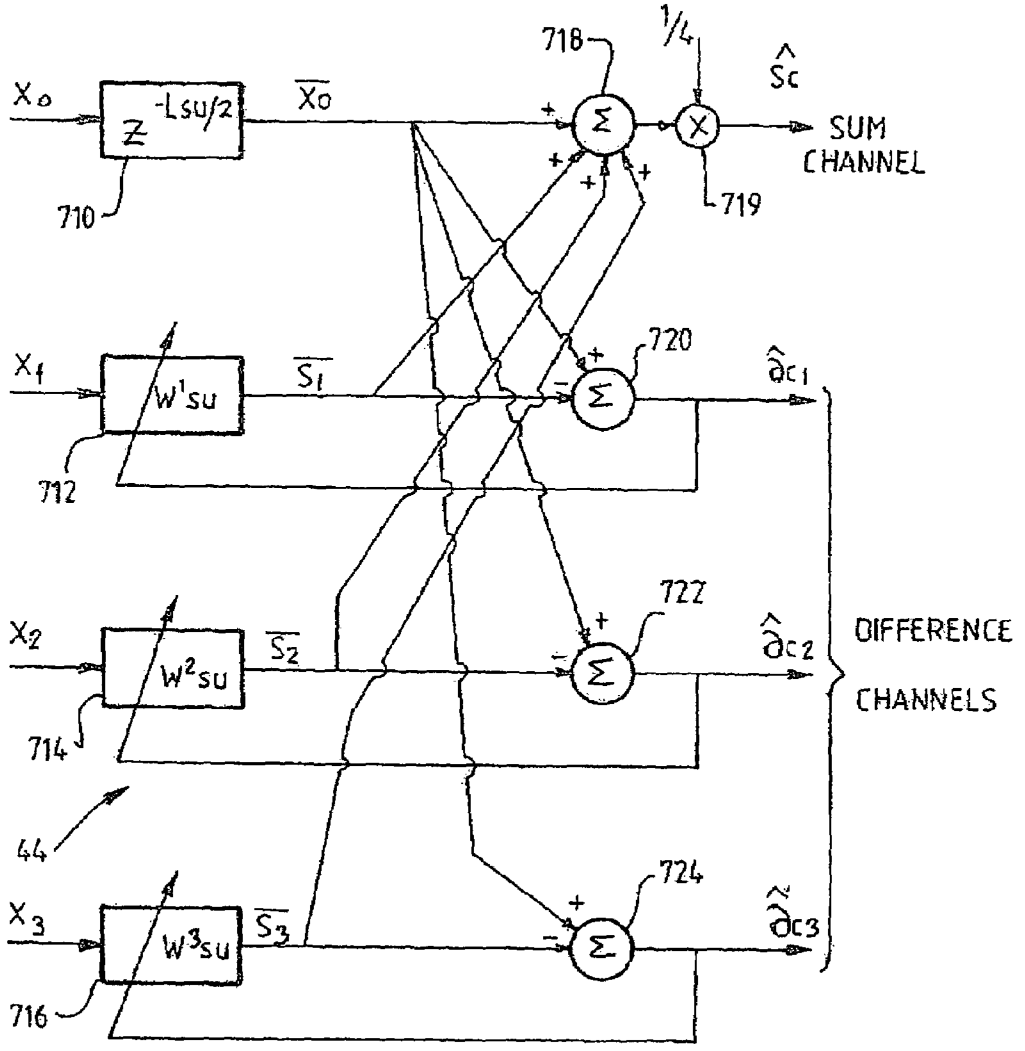
FIG. 10 shows the schematic block diagram of the four channels Adaptive Spatial Filter.

FIG. 10 shows a block diagram of the Adaptive Linear Spatial Filter 44. The function of the filter is to separate the coupled target interference and noise signals into two types. The first, in a single output channel termed the Sum Channel, is an enhanced target signal having weakened interference and noise i.e. signals not from the target signal direction. The second, in the remaining channels termed Difference Channels, which in the four channel case comprise three separate outputs, aims to comprise interference and noise signals alone.

The objective is to adopt the filter coefficients of filter 44 in such a way so as to enhanced the target signal and output it in the Sum Channel and at the same time eliminate the target signal from the coupled signals and output them into the Difference Channels.

The adaptive filter elements in filter 44 acts as linear spatial prediction filters that predict the signal in the reference channel whenever the target signal is present. The filter stops adapting when the signal is deemed to be absent.

The filter coefficients are updated whenever the conditions of steps are met, namely:

i. The adaptive threshold detector detects the presence of signal;

ii The time delay estimation is within a certain threshold;

iii The peak ratio exceeds a certain threshold;

iv The cross correlation exceeds a certain threshold;

v The dynamic noise power level exceed a certain threshold;

As illustrated in FIG. 10, the digitized coupled signal $X_0$ from sensor 10*a* is fed through a digital delay element 710 of delay $Z^{-Lsu/2}$. Digitized coupled signals $X_1$, $X_2$, $X_3$ from sensors 10*b*, 10*c*, 10*d* are fed to respective filter elements 712,4,6. The outputs from elements 710,2,4,6 are summed at Summing element 718, the output from the Summing element 718 being divided by four at the divider element 719 to form the Sum channel output signal. The output from delay element 710 is also subtracted from the outputs of the filters 712,4,6 at respective Difference elements 720,2,4, the output from each Difference element forming a respective Difference channel output signal, which is also fed back to the respective filter 712,4,6. The function of the delay element 710 is to time align the signal from the reference channel 10*a* with the output from the filters 712,4,6.

The filter elements 712,4,6 adapt in parallel using the normalized LMS algorithm given by Equations E.1 . . . E.8 below, the output of the Sum Channel being given by equation E.1 and the output from each Difference Channel being given by equation E.6:

$$\hat{S}_c(k) = \frac{\overline{S}(k) + \overline{X}_0(k)}{4} \quad \text{E.1}$$

$$\text{Where: } \overline{S}(k) = \sum_{m=1}^{M-1} \overline{S}_m(k) \quad \text{E.2}$$

$$\overline{S}_m(k) = (W_{su}^m(k))^T X_m(k) \quad \text{E.3}$$

Where m is 0,1,2 . . . M−1, the number of channels, in this case 0 . . . 3 and $^T$ denotes the transpose of a vector.

$$X_m(k) = \begin{bmatrix} X_{1m}(k) \\ X_{2m}(k) \\ M \\ X_{LSUm}(k) \end{bmatrix} \quad \text{E.4}$$

$$W_{su}^m(k) = \begin{bmatrix} W_{suI}^m(k) \\ W_{su2}^m(k) \\ M \\ W_{suLSU}^m(k) \end{bmatrix} \quad \text{E.5}$$

Where $X_m(k)$ and $W_{su}{}^m(k)$ are column vectors of dimension (Lsu×1).

The weight $X_m(k)$ is updated using the normalized LMS algorithm as follows:

$$\hat{\partial}_{cm}(k) = \overline{X}_0(k) - \overline{S}_m(k) \quad \text{E.6}$$

$$W_{su}{}^m(k+1) = W_{su}{}^m(k) + 2\mu_{su}{}^m X_m(k)\hat{\partial}_{cm}(k) \quad \text{E.7}$$

$$\text{Where}: \mu_{su}^m = \frac{\beta_{su}}{\|X_m(k)\|} \quad \text{E.8}$$

and where $\beta_{su}$ is a user selected convergence factor $0<\beta_{su}\leqq 2$, $\| \|$ denoted the norm of a vector and k is a time index.

Adaptive Spatial Filter Coefficient Restoration (Steps 536-542)

In the events of wrong updating of Spatial Filter, the coefficients of the filter could adapt to the wrong direction or sources. To reduce the effect, a set of 'best coefficients' is kept and copied to the beam-former coefficients when it is detected to be pointing to a wrong direction, after an update.

Two mechanisms are used for these:

A set of 'best weight' includes all of the three filter coefficients ($W_{su}{}^1$−$W_{su}{}^3$). They are saved based on the following conditions:

When there is an update on filter coefficients $W_{su}$, the calculated $P_{k2}$ ratio is compared with the previous stored $BP_k$, if it is above the $BP_k$, this new set of filter coefficients shall become the new set of 'best weight' and current $P_{k2}$ ratio is saved as the new $BP_k$ with a forgetting factor as follows:

$$BP_k = P_{k2} * \alpha$$

In this embodiment the forgetting factor α is selected as 0.95 to prevent $BP_k$ saturated and filter coefficient restore mechanism being locked.

A second mechanism is used to decide when the filter coefficients should be restored with the saved set of 'best weights'. This is done when filter coefficients are updated and the calculated $P_{k2}$ ratio is below $BP_k$ and threshold $T_{Pk}$. In this embodiment, the value of $T_{Pk}$ is equal to 0.65.

Calculation of Energy Ratio $R_{sd}$ (Step 548)

This is performed as follows:

$$\hat{S}_c = \begin{bmatrix} \hat{S}_c(0) \\ \hat{S}_c(1) \\ \vdots \\ \hat{S}_c(J-1) \end{bmatrix} \quad \text{F.1}$$

J=N/2, the number of samples, in this embodiment 256.

$$\hat{D}_c = \begin{bmatrix} \hat{\partial}_c(0) \\ \hat{\partial}_c(1) \\ \vdots \\ \hat{\partial}_c(J-1) \end{bmatrix} = \begin{bmatrix} \hat{\partial}_{cI}(0) \\ \hat{\partial}_{cI}(1) \\ \vdots \\ \hat{\partial}_{cI}(J-1) \end{bmatrix} + \begin{bmatrix} \hat{\partial}_{c2}(0) \\ \hat{\partial}_{c2}(1) \\ \vdots \\ \hat{\partial}_{c2}(J-1) \end{bmatrix} + \begin{bmatrix} \hat{\partial}_{c3}(0) \\ \hat{\partial}_{c3}(1) \\ \vdots \\ \hat{\partial}_{c3}(J-1) \end{bmatrix} \quad \text{F.2}$$

$$E_{SUM} = \frac{1}{J-2}\sum_{j=1}^{J-2} \hat{S}_c(j)^2 - \hat{S}_c(j-1)\hat{S}_c(j-1) \quad \text{F.3}$$

$$E_{DIF} = \frac{1}{3(J-2)}\sum_{j=1}^{J-2} \hat{\partial}_c(j)^2 - \hat{\partial}_c(j-1)\hat{\partial}_c(j-1) \quad \text{F.4}$$

$$R_{sd} = \frac{E_{SUM}}{E_{DIF}} \quad \text{F.5}$$

Where $E_{SUM}$ is the sum channel energy and $E_{DIF}$ is the difference channel energy.

The energy ratio between the Sum Channel and Difference Channel ($R_{sd}$) must not exceed a dynamic threshold Trsd.

Calculation of Power Ratio $P_{rsd}$ (Step 548)

This is performed as follows:

$$\hat{S}_c = \begin{bmatrix} \hat{S}_c(0) \\ \hat{S}_c(1) \\ \vdots \\ \hat{S}_c(J-1) \end{bmatrix}$$

$$\hat{\partial}_c = \begin{bmatrix} \hat{\partial}_c(0) \\ \hat{\partial}_c(1) \\ \vdots \\ \hat{\partial}_c(J-1) \end{bmatrix}$$

-continued $$= \begin{bmatrix} \hat{\partial}_{c1}(0) \\ \hat{\partial}_{c1}(1) \\ \vdots \\ \hat{\partial}_{c1}(J-1) \end{bmatrix} + \begin{bmatrix} \hat{\partial}_{c2}(0) \\ \hat{\partial}_{c2}(1) \\ \vdots \\ \hat{\partial}_{c2}(J-1) \end{bmatrix} + \begin{bmatrix} \hat{\partial}_{c3}(0) \\ \hat{\partial}_{c3}(1) \\ \vdots \\ \hat{\partial}_{c3}(J-1) \end{bmatrix}$$

J=N/2, the number of samples, in this embodiment 128.

Where $P_{SUM}$ is the sum channel power and $P_{DIF}$ is the difference channel power.

$$P_{SUM} = \frac{1}{J}\sum_{j=0}^{J-1} \hat{S}_c(j)^2$$

$$P_{DIF} = \frac{1}{3(J)}\sum_{j=0}^{J-1} \hat{\partial}_c(j)^2$$

$$P_{rsd} = \frac{P_{SUM}}{P_{DIF}}$$

The power ratio between the Sum Channel and Difference Channel must not exceed a dynamic threshold, $T_{Prsd}$.

Dynamic Noise Energy Threshold Updating $T_{Rsd}$ (Step 550)

This dynamic noise energy threshold, $T_{Rsd}$ is estimated based on the dynamic noise power level, $N_{Prsd}$. In this case $T_{Rsd}$ will track closely with $N_{Prsd}$.

This dynamic noise energy threshold, $T_{Rsd}$ is updated base on the following conditions:

If the dynamic noise power is more than 0.8, $$T_{Rsd}=\alpha_1 * N_{Prsd}$$

Else $$T_{Rsd}=\alpha_2 * N_{Prsd}$$

In this embodiment, $\alpha_1$=1.7 and $\alpha_2$=1.1 have been found to give good results. The maximum value of $T_{Rsd}$ is set at 1.2 and the minimum value is set at 0.5.

Maximum Dynamic Noise Power Threshold Updating $T_{Prsd\_max}$ (Step 550)

This maximum dynamic noise power threshold, $T_{Prsd\_max}$ is estimated based on the dynamic noise power level, $N_{Prsd}$. It is used to determine the maximum noise power threshold for the dynamic noise power threshold, $T_{Prsd}$.

This maximum dynamic noise power threshold, $T_{Prsd\_max}$ is updated base on the following conditions:

If the dynamic noise power is more than 0.8, $$T_{Prsd\_max}=1.3$$

Else

If the reference channel signal energy is more than 1000

$$T_{Prsd\_max}=\alpha_1 * N_{Prsd}$$

Else $$T_{Prsd\_max}=\alpha_2 * N_{Prsd}$$

In this embodiment, $\alpha_1$=1.23 and $\alpha_2$=1.45 have been found to give good results.

Dynamic Noise Power Threshold Updating $T_{Prsd}$ (Step 550)

This dynamic noise power threshold, $T_{Prsd}$ will track closely to the dynamic noise power level, $N_{Prsd}$ and is updated base on the following conditions:

If the reference channel signal energy is more than 700 and power ratio is less than 0.45 for 64 consecutive processing blocks, $$T_{Prsd}=\alpha_1 * T_{Prsd}+(1-\alpha_1) * P_{rsd}$$

Else if the reference channel signal energy is less that 700, then $$T_{Prsd}=\alpha_2 * T_{Prsd}+(1-\alpha_2) * T_{Prsd\_max}$$

In this embodiment, $\alpha_1$=0.7 and $\alpha_2$=0.98 have been found to give good results. The maximum value of $T_{Prsd}$ is set at $T_{Prsd\_max}$ and the minimum value is set at 0.45.

Error Feedback Factor, $F_b$ (Step 553)

Figure 11:
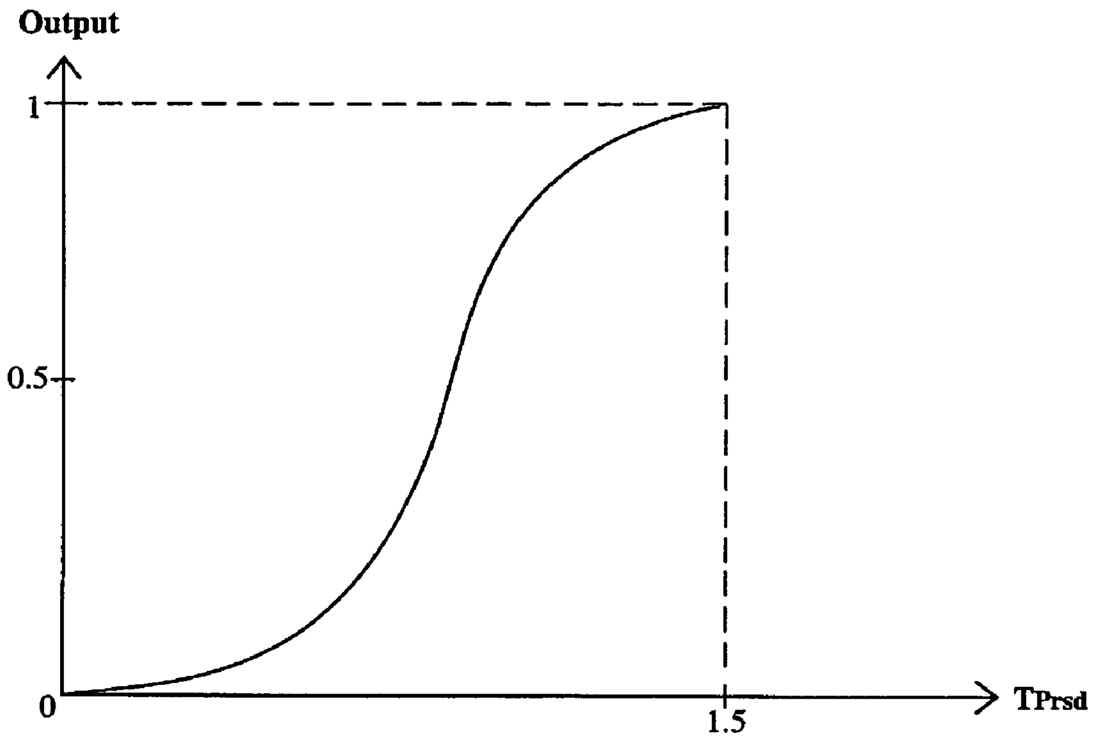
FIG. 11 is a response curve of S-shape transfer function (S function)

Wrong updating or uncontrolled adaptation of interference filter coefficient during noisy and the presence of target signal can lead to signal cancellation and drastic performance degradation. On the other hand, an error feedback loop in filter coefficient updating will provide a more stable but slower convergent rate LMS. A feedback factor is implemented to adjust the amount of feedback based on noise level to obtain a balance among convergent rate, system stability and performance. This feedback factor is calculated as follows:

$$F_b=1-\mathrm{sfun}(T_{Pr\,sd},0,1.5)$$

where sfun is a non-linear S-shape transfer function as shown in FIG. 11.

Frequency Domain Adaptive Interference and Noise Filter 46 (Steps 554-558)

Figure 12:
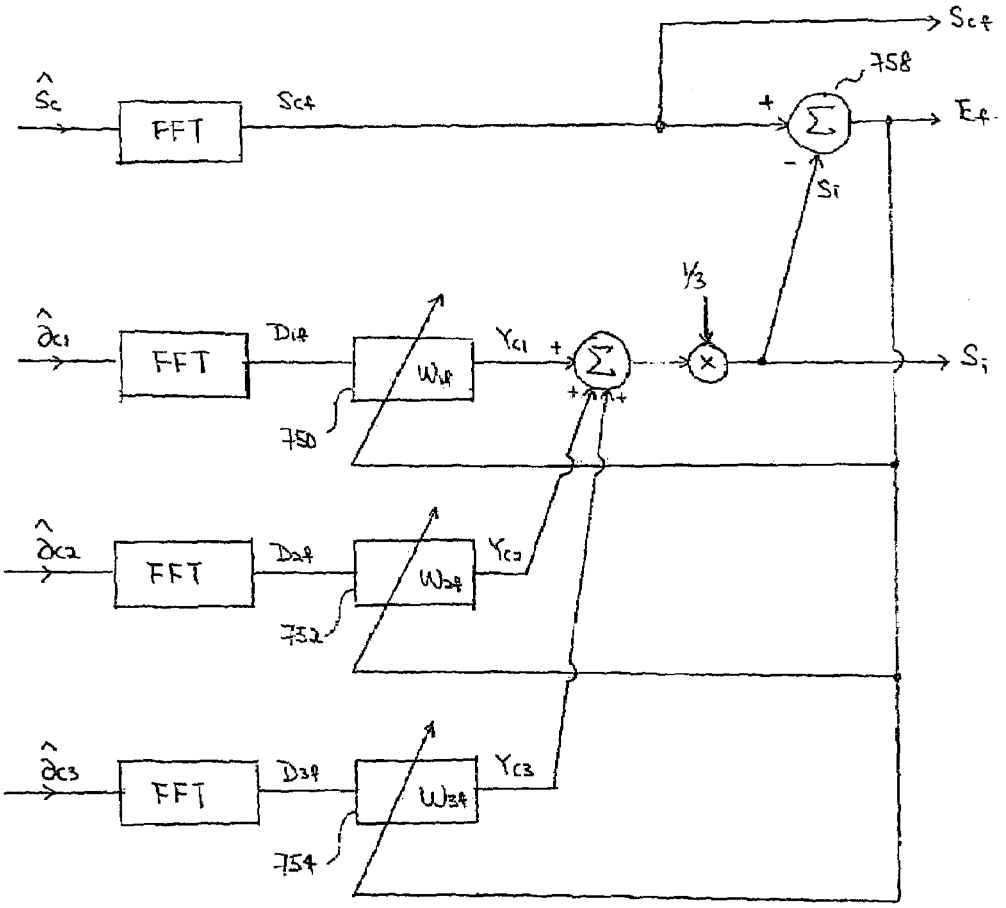
FIG. 12 shows the schematic block diagram of the Frequency Domain Adaptive Interference and Noise Filter.

FIG. 12 shows a schematic block diagram of the Frequency Domain Adaptive Interference and Noise Filter 46. This filter adapts to noise and interference signal and subtracts it from the Sum Channel so as to derive an output with reduced interference noise in FFT domain.

In order to implement the well known overlap add block-processing technique, outputs from the Sum and Difference Channels of the filter 44 are buffered into a memory as illustrated in FIG. 13. The buffer consists of N/2 of new samples and N/2 of old samples from the previous block.

A Hanning Window is then applied to the N samples buffered signals as illustrated in FIG. 14 expressed mathematically as follows:

$$S_h = \begin{bmatrix} \hat{S}_c(t+1) \\ \hat{S}_c(t+2) \\ M \\ \hat{S}_c(t+N) \end{bmatrix} \cdot H_n \qquad \text{(H.3)}$$

-continued $$D_{mh} = \begin{bmatrix} \hat{\partial}_{cm}(t+1) \\ \hat{\partial}_{cm}(t+2) \\ M \\ \hat{\partial}_{cm}(t+N) \end{bmatrix} \cdot H_n \qquad (H.4)$$

Where $(H_n)$ is a Hanning Window of dimension N, N being the dimension of the buffer. The "dot" denotes point-by-point multiplication of the vectors. t is a time index and m is 1,2 . . . M−1, the number of difference channels, in this case 1,2,3.

The resultant vectors $[S_h]$ and $[D_{mh}]$ are transformed into the frequency domain using Fast Fourier Transform algorithm as illustrated in equation H.6, H.7 and H.8 below:

$$S_{cf}=\text{FFT}(S_h) \qquad (H.6)$$

$$D_{mf}=\text{FFT}(D_{mh}) \qquad (H.7)$$

As illustrate at FIG. 12, the filter 46 takes $D_{1f}$, $D_{2f}$, and $D_{3f}$ and feeds the Difference Channel Signals in parallel to a set of frequency domain adaptive filter elements 750,2,4. The outputs from the three filter elements 750,2,4 $S_i$ are subtracted from the $S_{cf}$ at Difference element 758 to form and error output $E_f$, which is fed back to the filter elements 750,2,4.

A modify block frequency domain Least Mean Square algorithm (FLMS) is used in this filter. This block frequency domain adaptive filter has faster convergent rate and less computational load as compared with time domain sliding window LMS algorithm use in PCT/SG99/00119. This frequency domain filter coefficients $W_{mf}$ is adapt as follows:

$$E_f(k)=S_{cf}(k)-S_i(k) \qquad (I.1)$$

$$\text{Where } S_i(k)=\frac{1}{M-1}\sum_{m=1}^{M-1}Y_{cm}(k) \quad Y_{cm}(k)=D_{mf}(k)W_{mf}(k) \qquad (I.2)$$

$$D_{mf}(k)=\text{diag}\{[D_{m,1}(k), \ldots ,D_{m,N}(k)]^r\} \qquad (I.3)$$

$$W_{mf}(k)=[W_{m,1}(k), \ldots W_{m,N}(k)]^r \qquad (I.4)$$

$$W_{mf}(k+1)=W_{mf}(k)+2\mu_m(k)D^*_{mf}(k)E_{f1}(k) \qquad (I.5)$$

$$\mu_m(k)=\beta_{uq}\text{diag}\{P_{m,1}^{-1}(k), \ldots ,P_{m,N}^{-1}(k)\} \qquad (I.6)$$

$$P_{m,n}(k)=F_b\|E_{f,n}(k)\|^2+\|D_{m,n}(k)\|^2 \qquad (I.7)$$

and where $\beta_{uq}$ is a user select factor $0<\beta_{uq}\leqq 2$. m is 1,2 . . . M−1, the number of difference channels, in this case 1,2 and 3 and n is 1, . . . N, the block processing size. The '*' denotes complex conjugate.

When target signal is presence and the Interference filter is updated wrongly, the error signal in equation I.1 will be very large. Hence, by including power of error signal $\|E_f\|^2$ into weight updating μ calculation (equation I.6) of each frequency beam, the value of μ will become very small whenever there is a wrong updating of Interference filter occur. This form an error feedback loop which help to prevent a wrong updating of weight coefficients of Interference filter and hence reduce the effect of signal cancellation. $F_b$ is the feedback factor determines the amount of feedback based on signal and noise level.

The output $E_f$ from equation I.1 is almost interference and noise free in an ideal situation. However, in a realistic situation, this cannot be achieved. This will cause signal cancellation that degrades the target signal quality or noise or interference will feed through and this will lead to degradation of the output signal to noise and interference ratio. The signal cancellation problem is reduced in the described embodiment by use of the Adaptive Spatial Filter 44 which reduces the target signal leakage into the Difference Channel. However, in cases where the signal to noise and interference is very high, some target signal may still leak into these channels.

To further reduce the target signal cancellation problem and unwanted signal feed through to the output, the output signals from processor 46 are fed into the Adaptive NonLinear Interference and Noise Suppression Processor 48 as described below.

Adaptive NonLinear Interference and Noise Suppression Processor 48 (Steps 562-580)

The frequency domain filter output $(S_i)$, error output signal $(E_f)$ and the Sum Channel output signal $(S_{cf})$ are combined as a weighted average as follows:

$$S_f=G_N*S_{cf}+G_E*E_f$$

$$I_f=G*S_i$$

The weights G, $G_N$ and $G_E$ are adaptively changing based on signal to noise and interference ratio to produce a best combination that optimize the signal quality and interference cancellation.

During quiet or low noise environment if a speech target signal is detected, $G_E$ will decrease and $G_N$ increase thus $S_f$ will receive more speech target signals from the Signal Adaptive Spatial Filter (Filter 44). In this case the filtered signal and the non-filtered signal will be closely matched. For noisy environment when a speech target signal is detected, $G_E$ will increase and $G_N$ decrease, now $S_f$ will receive more speech target signals from the Adaptive Interference Filter (Filter 46). Now the speech signal will be highly coupled with noise and this need to be filtered out. G will determine the amount of noise input signal.

$G_{new}$ is chosen based on the lower and upper limit of the s-function on the Energy Ratio, $R_{sd}$. Depending of the update condition of the Signal Adaptive Spatial Filter and the Adaptive Interference Filter, the value of G, $G_N$ and $G_E$ are calculated and stored separately for each update condition. These stored values are used in the next cycle of computation. This will ensure a steady state value even if the update condition changes frequently.

This three Signal to Noise Ratio Gain G, $G_N$ and $G_E$ are updated base on the following conditions:

If the Signal Adaptive Spatial Filter is updated, $$G_1=\alpha_1*G_1+(1-\alpha_1)*G_{new}$$

$$G_{E1}=\alpha_1*G_{E1}+(1-\alpha_1)*G_1$$

$$G_{N1}=\alpha_1*G_{N1}+(1-\alpha_1)*(1-G_1)$$

$$G=G_1$$

$$G_E=G_{E1}$$

$$G_N=G_{N1}$$

Else if the Adaptive Interference Filter is updated, $$G_2=\alpha_1*G_1+(1-\alpha_1)*G_{new}$$

$$G_{E2}=\alpha_1*G_{E2}+(1-\alpha_1)*G_2$$

$$G_{N2}=\alpha_1*G_{N2}+(1-\alpha_1)*(1-G_2)$$

$$G=G_2$$

$$G_E=G_{E2}$$

$$G_N=G_{N2}$$

Else then, $$G_3=\alpha_1*G_3+(1-\alpha_1)*G_{new}$$

$$G_{E3}=\alpha_1*G_{E3}+(1-\alpha_1)*G_3$$

$$G_{N3}=\alpha_1*G_{N3}+(1-\alpha_1)*(1-G_3)$$

$$G=G_3$$

$$G_E=G_{E3}$$

$$G_N=G_{N3}$$

In this embodiment, $\alpha_1=0.9$ has been found to give good results.

A modified spectrum is then calculated, which is illustrated in Equations H.9 and H.10:

$$P_s=|\mathrm{Re}(S_f)|+|\mathrm{Im}(S_f)|+F(S_f)*r_s \quad \text{(H.9)}$$

$$P_i=|\mathrm{Re}(I_f)|+|\mathrm{Im}(I_f)|+F(I_f)*r_i \quad \text{(H.10)}$$

Where "Re" and "Im" refer to taking the absolute values of the real and imaginary parts, $r_s$ and $r_i$ are scalars and $F(S_f)$ and $F(I_f)$ denotes a function of $S_f$ and $I_f$ respectively.

One preferred function F using a power function is shown below in equation H.11 and H.12 where "Conj" denotes the complex conjugate:

$$P_s=|\mathrm{Re}(S_f)|+|\mathrm{Im}(S_f)|+(S_f*\mathrm{conj}(S_f))*r_s \quad \text{(H.11)}$$

$$P_i=|\mathrm{Re}(I_f)|+|\mathrm{Im}(I_f)|+(I_f*\mathrm{conj}(I_f))*r_i \quad \text{(H.12)}$$

A second preferred function F using a multiplication function is shown below in equations H.13 and H.14:

$$P_s=|\mathrm{Re}(S_f)|+|\mathrm{Im}(S_f)|+|\mathrm{Re}(S_f)|*|\mathrm{Im}(S_f)|*r_s \quad \text{(H.13)}$$

$$P_i=|\mathrm{Re}(I_f)|+|\mathrm{Im}(I_f)|+|\mathrm{Re}(I_f)|*|\mathrm{Im}(I_f)|*r_i \quad \text{(H.14)}$$

The values of the scalars ($r_s$ and $r_i$) control the tradeoff between unwanted signal suppression and signal distortion and may be determined empirically. ($r_s$ and $r_i$) are calculated as $1/(2^{vs})$ and $1/(2^{vi})$ where vs and vi are scalars. In this embodiment, vs=vi is chosen as 8 giving $r_s=r_i=1/256$. As vs and vi reduce, the amount of suppression will increase.

The Spectra ($P_s$) and ($P_i$) are warped into (Nb) critical bands using the Bark Frequency Scale [See Lawrence Rabiner and Bing Hwang Juang, Fundamental of Speech Recognition, Prentice Hall 1993]. The number of Bark critical bands depends on the sampling frequency used. For a sampling of 16 kHz, there will be Nb=22 critical bands. The warped Bark Spectrum of ($P_s$) and ($P_i$) are denoted as ($B_s$) and ($B_i$).

Probability of Speech Present, PB_Speech

This probability of speech present is to give a good indication of whether target signal present at the input even the environment is very noisy and the SNR below 0 dB. It is calculated as follows:

$$Sp=\frac{P_s}{P_i+1}$$

$$pbs_k(n)=\alpha*pbs_{k-1}(n)+(1-\alpha)*Isp$$

$$\text{where } \begin{cases} Isp=1 & \text{if } Sp(n)>2.5 \\ Isp=0 & \text{if } Sp(n)\le 2.5 \end{cases}$$

$$\text{PB\_Speech}=\overline{pbs}$$

where, n=1 to Nb and $\alpha$ is used to adjust the rate of adaptation of the probability, in this embodiment $\alpha=0.2$ give a good result. A high PB_Speech that closer to one indicate a high probability of target signal present at the input. Whereas, a low PB_Speech indicates the probability of target signal present at the input is low.

Voice Unvoiced Detection and Amplification

This is used to detect voice or unvoiced signal from the Bark critical bands of sum signal and hence reduce the effect of signal cancellation on the unvoiced signal. It is performed as follows:

$$B_s=\begin{bmatrix} B_s(0) \\ B_s(1) \\ \vdots \\ B_s(Nb) \end{bmatrix}$$

$$V_{sum}=\sum_{n=0}^{k} B_s(n)$$

where k is the voice band upper cutoff $$U_{sum}=\sum_{n=l}^{Nb} B_s(n)$$

where l is the unvoiced band lower cutoff $$\text{Unvoice\_Ratio}=\frac{U_{sum}}{V_{sum}}$$

If Unvoice_Ratio>Unvoice_Th $$B_s(n)=B_s(n)\times A$$

where $l\leqq n\leqq Nb$

In this embodiment, the value of voice band upper cutoff k, unvoiced band lower cutoff l, unvoiced threshold Unvoice_Th and amplification factor A is equal to 16, 18, 10 and 8 respectively.

A Bark Spectrum of the system noise and environment noise is similarly computed and is denoted as ($B_n$). $B_n$ is first established during system initialization as $B_n=B_s$ and continues to be updated when no target signal is detected by the system i.e. any silence period. $B_n$ is updated as follows:

If the signal energy of the reference signal $E_{r1}$ is less than threshold, $T_{tge1}$ and the average power of the reference signal is less than threshold, $T_{ae}$ or during the first 20 cycles of system initialization then, If the signal energy of the reference signal is less than the noise level $N_{tge}$, $\alpha=0.98$ Else $\alpha=0.9$ $B_n=\alpha*B_n+(1-\alpha)*B_s$ Using ($B_s$, $B_i$ and $B_n$) a non-linear technique is used to estimate a gain ($G_b$) as follows:

First the unwanted signal Bark Spectrum is combined with the system noise Bark Spectrum by using as appropriate weighting function as illustrate in Equation J.1.

$$B_y=\Omega_1 B_i+\Omega_2 B_n \quad \text{(J.1)}$$

$\Omega_1$ and $\Omega_2$ are weights whose can be chosen empirically so as to maximize unwanted signals and noise suppression with minimized signal distortion. In this embodiment, $\Omega_1=1.0$ and $\Omega_2=0.25$.

Follow that a post signal to noise ratio is calculated using Equation J.2 and J.3 below:

$$R_{po}=\frac{B_s}{B_y} \quad \text{(J.2)}$$

$$R_{pp}=R_{po}-I_{Nbx1} \quad \text{(J.3)}$$

The division in equation J.2 means element-by-element division and not vector division. $R_{po}$ and $R_{pp}$ are column vectors of dimension (Nb×1), Nb being the dimension of the Bark Scale Critical Frequency Band and $I_{Nb\times 1}$ is a column unity vector of dimension (Nb×1) as shown below:

$$R_{po}=\begin{bmatrix} r_{po}(1) \\ r_{po}(2) \\ M \\ r_{po}(Nb) \end{bmatrix} \quad \text{(J.4)}$$

$$R_{pp}=\begin{bmatrix} r_{pp}(1) \\ r_{pp}(2) \\ M \\ r_{pp}(Nb) \end{bmatrix} \quad \text{(J.5)}$$

$$I_{Nbx1}=\begin{bmatrix} 1 \\ 1 \\ M \\ 1 \end{bmatrix} \quad \text{(J.6)}$$

If any of the $r_{pp}$ elements of $R_{pp}$ are less than zero, they are set equal to zero.

Using the Decision Direct Approach [see Y. Ephraim and D. Malah: Speech Enhancement Using Optimal Non-Linear Spectrum Amplitude Estimation; Proc. IEEE International Conference Acoustics Speech and Signal Processing (Boston) 1983, pp 1118-1121.], the a-priori signal to noise ratio $R_{pr}$ is calculated as follows:

$$R_{pr}=(1-\beta_i)*R_{pp}+\beta_i*\frac{B_o}{B_y} \quad \text{(J.7)}$$

$$B_o/B_y \quad \text{(J.7)}$$

The division in Equation J.7 means element-by-element division. $B_o$ is a column vector of dimension (Nb×1) and denotes the output signal Bark Scale Bark Spectrum from the previous block $B_o=G_b\times B_s$ (See Equation J.15) ($B_o$ initially is zero). $R_{pr}$ is also a column vector of dimension (Nb×1). The value of $\beta_i$ is given in Table 1 below:

TABLE 1

| | i | | | | |
|---|---|---|---|---|---|
| | 1 | 2 | 3 | 4 | 5 |
| $\beta_i$ | 0.01625 | 0.1225 | 0.245 | 0.49 | 0.98 |

The value i is set equal to 1 on the onset of a signal and $\beta_i$ value is therefore equal to 0.01625. Then the i value will count from 1 to 5 on each new block of N/2 samples processed and stay at 5 until the signal is off. The i will start from 1 again at the next signal onset and the $\beta_i$ is taken accordingly.

Instead of $\beta_i$ being constant, in this embodiment $\beta_i$ is made variable based on PB_Speech and starts at a small value at the onset of the signal to prevent suppression of the target signal and increases, preferably exponentially, to smooth $R_{pr}$.

From this, $R_{rr}$ is calculated as follows:

$$R_{rr}=\frac{R_{pr}}{I_{Nbx1}+R_{pr}} \quad \text{(J.8)}$$

The division in Equation J.8 is again element-by-element. $R_{rr}$ is a column vector of dimension (Nb×1).

From this, $L_x$ is calculated:

$$L_x=R_{rr}\cdot R_{po} \quad \text{(J.9)}$$

The value $L_x$ of is limited to Pi (≈3.14). The multiplication is Equation J.9 means element-by-element multiplication. $L_x$ is a column vector of dimension (Nb×1) as shown below:

$$L_x=\begin{bmatrix} l_x(1) \\ l_x(2) \\ M \\ l_x(nb) \\ M \\ l_x(Nb) \end{bmatrix} \quad \text{(J.10)}$$

A vector $L_y$ of dimension (Nb×1) is then defined as:

$$L_y=\begin{bmatrix} l_y(1) \\ l_y(2) \\ M \\ l_y(nb) \\ M \\ l_y(Nb) \end{bmatrix} \quad \text{(J.11)}$$

Where nb=1,2 . . . Nb. Then $L_y$ is given as:

$$l_y(nb)=\exp\left(\frac{E(nb)}{2}\right) \quad \text{(J.12)}$$

-continued and $$E(nb) = -0.57722 - \log(l_x(nb)) + l_x(nb) - \frac{(l_x(nb))^2}{4} + \frac{(l_x(nb))^3}{8} - \frac{(l_x(nb))^4}{96}K \quad (J.13)$$

E(nb) is truncated to the desired accuracy. $L_y$ can be obtained using a look-up table approach to reduce computational load.

Finally, the Gain $G_b$ is calculated as follows:

$$G_b = R_{rr} \cdot L_y \quad (J.14)$$

The "dot" again implies element-by-element multiplication. $G_b$ is a column vector of dimension (Nb×1) as shown:

$$G_b = \begin{bmatrix} g(1) \\ g(2) \\ M \\ g(nb) \\ M \\ g(Nb) \end{bmatrix} \quad (J.15)$$

As $G_b$ is still in the Bark Frequency Scale, it is then unwrapped back to the normal linear frequency scale of N dimensions. The unwrapped $G_b$ is denoted as G.

The output spectrum with unwanted signal suppression is given as:

$$\bar{S}_f = G \cdot S_f \quad (J.16)$$

The "·" again implies element-by-element multiplication.

The recovered time domain signal is given by:

$$\bar{S}_t = \mathrm{Re}(\mathrm{IFFT}(\bar{S}_f)) \quad (J.17)$$

IFFT denotes an Inverse Fast Fourier Transform, with only the Real part of the inverse transform being taken.

The time domain signal is obtained by overlap add with the previous block of output signal:

$$S_t = \begin{bmatrix} \bar{S}_t(1) \\ \bar{S}_t(1) \\ M \\ \bar{S}_t(N/2) \end{bmatrix} + \begin{bmatrix} Z_t(1) \\ Z_t(1) \\ M \\ Z_t(N/2) \end{bmatrix} \quad (J.18)$$

$$\text{Where: } Z_t = \begin{bmatrix} \bar{S}_{t-1}(1+N/2) \\ \bar{S}_{t-1}(2+N/2) \\ M \\ \bar{S}_{t-1}(N) \end{bmatrix} \quad (J.19)$$

This time domain signal is then multiplex with a reference channel signal in wavelet domain to recover any high frequency component that loss through out the processing.

High Frequency Recovery (Step 581)

A one level wavelet transform is performed on both the reference signal and the time domain output signal as follows:

$$[Zw_L\ Zw_H] = \mathrm{DWT}(X_y)$$

$$[Zd_L\ Zd_H] = \mathrm{DWT}(S_t)$$

where L=1:N/4, H=N/4+1:N/2 and DWT denote discrete wavelet transform.

Then the high frequency recovery is perform on the wavelet domain as follows:

If the signals are A' signals from step 528

$$Zs_H = G_E * Zw_H + G_N * Zd_H$$

else $$Zs_H = G_N * Zw_H + G_E * Zd_H$$

The final time domain output signal is then obtained by performing an inverse wavelet transform on the multiplex sub-bands as follows:

$$\hat{S}_t = \mathrm{IDWT}[Zd_L\ Zs_H]$$

Although the interference and noise signals have been suppressed to a great deal by the Adaptive NonLinear Interference and Noise Suppression Processor, residual interference signals of small magnitude do exist at the output $\hat{S}_t$. When this output is used to drive a speaker and be listened by a person, these residual interference signals were barely audible or intelligible and were thus ignored by the listener. However, when this output is fed to a speech recognition engine, the residual interference signals cause false triggering of the Speech Recognition Engine.

In order to reduce the frequency of false triggering, the Speech Signal Pre-processor was introduced to further process the output signal from the Adaptive Interference and Noise Cancellation and Suppression Processor.

Speech Signal Pre-Processor 50 (Step 582-598)

Figure 15:
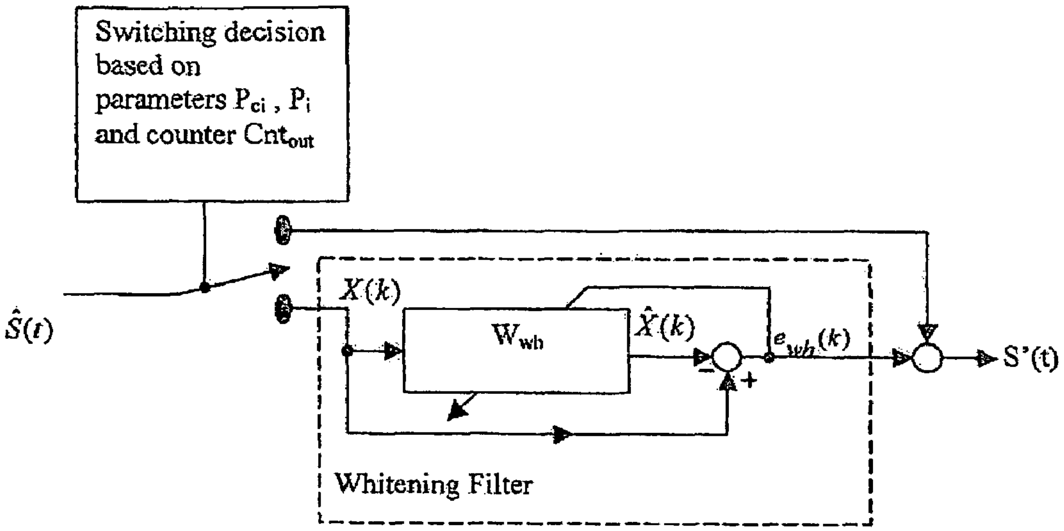
FIG. 15 shows the block diagram of Speech Signal Pre-processor

FIG. 15 depicts the block diagram of the speech signal pre-processor. The pre-processor gathers information from the various stages of the processor 42-48 and compute the parameters: continuous interference parameter $P_{ci}$ and intermittent interference status parameter $P_i$. Base on the value of $P_{ci}$. and counter $Cnt_{out}$ and the status of $P_i$, a decision is made on whether the signal $\hat{S}_t$ should be processed by the Adaptive Whitening Filter.

Should $P_{ci}$ be lower than dynamic continuous interference threshold $P_{TH}$, which is determined empirically, or the logic value of $P_i$ is '1' and together with the condition that the value of $Cnt_{out}$ is less than 0, the input signal will be processed by the whitening filter. Otherwise, the input signal will simply bypass the whitening filter. In the whitening filter implementation, the Normalized Least Mean Square algorithm (NLMS) is used to adaptively adjust the coefficients of the tapped delay line filter.

The rationale for having two parameters has been that the $P_i$ parameter is useful in situation where the interference from the side of the sensors is intermittent while $P_{ci}$ is useful in situation where the interference is continuous. The use of counter $Cnt_{out}$ has been a strategy adopted to protect the ending segment of desired speech signal. During this ending segment of speech, which is of small magnitude, parameters $P_{ci}$. and $P_i$ tend to be unreliable. This situation is especially true under loud interferences from the sides of the sensors. A counter Cnter is used to count the number of consecutive buffers which return false for the status of the Boolean expression $P_{ci} < P_{TH}$ OR $P_i = 1$. When Cnter reached a pre-specified value, which is equal to 20 in this embodiment, it signify that the algorithm is currently processing a desired speech segment, the algorithm then set the counter $Cnt_{out}$ equal to a fixed value which correspond to the number of buffers to be output in the first instance when status of the Boolean expression $P_{ci} < P_{TH}$ OR $P_i = 1$ return true.

For the dynamic continuous interference threshold $P_{TH}$, it is selected base on the following conditions:

| |
|---|
| If the $T_{Prsd}$ is less than 0.5,<br>$P_{TH} = \chi_1$<br>Else<br>$P_{TH} = \chi_2$ |

Setting $\chi_1=0.05$ and $\chi_2=0.143$ have been able to produce good results.

Calculation of Intermittent Interference Parameter, $P_i$ (Step 582)

The logic value of intermittent interference status parameter $P_i$ is determined through the following conditions,

| |
|---|
| If abs($T_d$) is greater than $\delta_1$ and $T_{Prsd}$ is greater than $\delta_2$ and $P_k$ is less than $\delta 3$,<br>$P_i = 1$<br>Else<br>$P_i = 0$ |

where abs( ) is taking the absolute value of its operand. In this embodiment, $\delta_1=2$, $\delta_2=1.0$ and $\delta_3=0.5$ have been found to give good results.

Calculation of Continuous Interference Parameter, $P_{ci}$ (Step 582)

In order to obtain a robust parameter to be used under varying interference scenarios, a number of parameters have been combined to create a new parameter. In this case, the suppression parameter is derived based on the weighted sum of three parameters given by the following equation:

$$P_{ci}=\epsilon_1 * P_{S\hat{\partial}}+\epsilon_2 * P_{wtpk}+\epsilon_3 * P_{micxcorr}$$

Computation of signal to error ratio $P_{S\hat{\partial}}$, normalized filter coefficient peak ratio $P_{wtpk}$ and transformed normalized crossed correlation estimation $P_{micxcorr}$ will follow in the next few sections. In this embodiment, $\epsilon_1=0.55$, $\epsilon_2=0.35$ and $\epsilon_3=0.1$ have been found to give good results.

Calculation of Signal to Error Ratio $P_{S\hat{\partial}}$ (Step 582)

$P_{S\hat{\partial}}$ is computed by mapping the ratio of $S_{pow}/\hat{\partial}_{c3\_pow}$ to a value of between 0 and 1 through the s-function. $S_{pow}$ is the power of the output signal $\hat{S}_t$ from the Adaptive Interference and Noise Cancellation and Suppression Processor and $\hat{\partial}_{c3\_pow}$ is the power of the signal on the last Difference Channel, $\hat{\partial}_{c3}$ (k). In the computation, the lower limit of the s-function is set to 0 while the upper limit, $L_u$, changes dynamically based on the following linear equation, $$L_u=9.1 * T_{Prsd}-3.37$$

In addition, the range of variation is also limited to be in the range of between 1.0 and 3.0.

If $L_u$ is less than 1.0, $$L_u=1.0$$

If $L_u$ is greater than 3.0, $$L_u=3.0$$

Calculation of Normalized Filter Coefficient Peak Ratio, $P_{wtpk}$ (Step 582)

The parameter $P_{wtpk}$ is derived from the product of two parameters, namely $P_{wt}$ and $P_{pk}$. $P_{wt}$ is computed by applying the s-function to the ratio of $A/\|W_{td}\|$. Where A is defined as the maximum value of tapped delay line filter coefficients $W_{td}$ within the index range of $$\frac{L0}{2}-\Delta \leq n \leq \frac{L0}{2}+\Delta,$$

where L0 is the filter length and $\Delta$ is calculated base on the threshold $\theta$, with $\theta$ equal to ±15° in this embodiment, $\Delta$ is equivalent to 2. And $\|W_{td}\|$ is the norm of the coefficients of the tapped delay line filter. $P_{pk}$ is obtained by applying the s-function to the $P_k$ parameter.

In this embodiment, the lower and upper limits used in the s-function for the computation of $P_{wt}$ are 0.2 and 1.0 respectively. As for $P_{pk}$, the lower and upper limits used in the s-function are 0.05 and 0.55 respectively.

Calculation of Transformed Normalized Crossed Correlation Estimation, $P_{micxcorr}$ (Step 582)

The parameter $P_{micxcorr}$ is derived from the normalized cross correlation estimation $C_x$, which is the cross correlation between the reference channel 10*a* and the most distant channel 10*d*. $P_{micxcorr}$ is computed by mapping $C_x$ to a value of between 0 and 1 through the s-function. In this embodiment, the upper limit of the s-function is set to 1 and the lower limit is set to 0 for this particular computation.

Adaptive Whitening filter (Step 598)

The whitening of output time sequence $\hat{S}_t$ is achieved through a one step forward prediction error filter. The objective of whitening is to reduce instances of false triggering to the Speech Recognition Engine cause by the residual interference signal.

Denoting the Lsux1 observation vector as, $$X_{wh}(k)=\begin{bmatrix}\hat{S}_t(k-1)\\ \hat{S}_t(k-2)\\ M\\ \hat{S}_t(k-LSU)\end{bmatrix} \text{ and } W_{wh}(k)=\begin{bmatrix}W_1(k)\\ W_2(k)\\ M\\ W_{LSU}(k)\end{bmatrix}$$

as the tap coefficients of the forward prediction error filter. The weight vector $W_{wh}(k)$ is updated using the normalized LMS algorithm as follows:

Predicted value of X(k), $$\hat{X}(k)=(W_{wh}(k))^T X_{wh}(k)$$

Forward prediction error, $$S_{wh}(k)=X(k)-\hat{X}(k)$$

Adaptation step size, $$\mu_{wh}(k)=\frac{\beta_{wh}}{\sigma\|X_{wk}(k)\|+(1-\sigma)S_{wh}^2(k)}$$

Tap-weight adaptation, $$W_{wh}(k+1)=W_{wh}(k)+2\mu_{wh}X_{wh}(k)S_{wh}(k)$$

where $^T$ denotes the transpose of a vector, $\|\ \|$ denotes the norm of a vector and $\beta_{wh}$ is a user selected convergence factor $0<\beta_{su}\leqq 2$, and k is a time index. The adaptation step size $\mu_{wh}(k)$ is slightly varied from that of the conventional normalized LMS algorithm. An error term $S_{wh}^2(k)$ is included in this case to provide better control of the rate of adaptation as well. The value of $\sigma$ is in the range of 0 to 1. In this embodiment, $\sigma$ is equal to 0.1.

The embodiment described is not to be construed as limitative. For example, there can be any number of channels from two upwards. Furthermore, as will be apparent to one skilled in the art, many steps of the method employed are essentially discrete and may be employed independently of the other steps or in combination with some but not all of the other steps. For example, the adaptive filtering and the frequency domain processing may be performed independently of each other and the frequency domain processing steps such as the use of the modified spectrum, warping into the Bark scale and use of the scaling factor $\beta_i$ can be viewed as a series of independent tools which need not all be used together.

Use of first, second etc. in the claims should only be construed as a means of identification of the integers of the claims, not of process step order. Any novel feature or combination of features disclosed is to be taken as forming an independent invention whether or not specifically claimed in the appendant claims of this application as initially filed.

The invention claimed is:

1. A method for reducing noise and interference for speech communication and speech recognition in an apparatus having a digital processing means for processing audio signals received in time domain from a plurality of microphones, said digital processing means comprising a first adaptive filter for enhancing a target signal in the audio signals and a second adaptive filter for reducing a non-target signal in the audio signals and an adaptive interference and noise suppression processor, said method comprising the steps:

a) initializing and estimating parameters, said step comprising:
   a1) collecting a predetermined number of samples;
   a2) pre-emphasizing or whitening of the samples;
   a3) calculating total non-linear energy and average power of signal samples;
   a4) transforming the samples to two sub-bands through a Discrete Wavelet Transform;
   a5) estimating environment noise energy levels;
   a6) re-performing step a5) if total non-linear energy and average power of signal energy is below a first noise threshold and a second noise threshold respectively;
   a7) estimating Bark Scale noise;
   a8) distinguishing between abrupt change in environment noise and possible target signal; and
   a9) updating of the first and second noise thresholds and environment noise energy levels and Bark scale noise;
b) determining direction of arrival of signal, testing for presence of target signal and processing by the first adaptive filter;
c) rechecking signal from the first adaptive filter and reconfirming updated filter coefficients;
d) testing for undesired signal, interference, and noise; and transforming these signals into the frequency domain;
e) processing by the second adaptive filter and wrapping into Bark scale; and
f) detecting and recovering unvoice signal, processing by adaptive interference and noise suppressor and high frequency recovery.

2. The method in accordance with claim 1, wherein step b) further comprises:

b1) calculating coefficients for determining direction of signals;
b2) determining presence or absence of target signal;
b3) reconfirming presence of target signal using four predetermined conditions if step b2) results in presence of target signal;
b4) performing adaptive filtering using first adaptive filter to adapt filter coefficients of the first adaptive filter to obtain a sum channel and a difference channel; and
b5) obtaining sum channel and difference channel without adapting filter coefficients if step b2) results in absence of target signal or if step b3) fails any of one of the four conditions.

3. The method in accordance with claim 2, wherein step c) further comprises:

c1) calculating filter coefficient peak ratio based on the filter coefficients of the first adaptive filter if processed signal is considered a target signal;
c2) replacing a best peak ratio with value of filter coefficient peak ration if filter coefficient peak ratio is larger than best peak ratio, and filter coefficients of the first adaptive filter are stored;
c3) restoring filter coefficients of the first adaptive filter to previous values if the filter coefficient peak ratio is below a predetermined threshold;
c4) calculating energy and power ratios between the sum and difference channel if processed signal is not considered a target signal; and
c5) updating noise thresholds based on energy and power ratios.

4. The method in accordance with claim 3, wherein step d) further comprises:

d1) determining presence of noise or interference signals using predetermined conditions;
d2) calculating a feedback factor if all of the predetermined conditions are not met;
d3) processing by second adaptive filter in the frequency domain to adapt filter coefficients of the second adaptive filter to reduce unwanted signals in the sum and difference channels; and
d4) processing by second adaptive filter in the frequency domain without adaptive filtering of sum and difference channels if any of the predetermined conditions in step d2) are met.

5. The method in accordance with claim 3, wherein step e) further comprises:

e1) calculating weighted averages from filter coefficients of first and second adaptive filters;
e2) calculating best combination signals from the weighted averages;
e3) calculating modified spectrum to provide "pseudo" spectrum values;
e4) warping "pseudo" spectrum values into Bark Frequency Scale to obtain Bark Frequency Scale values; and
e5) calculating probability of speech using the Bark Frequency Scale values.

6. The method in accordance with claim 5, wherein step f) further comprises:

f1) detecting and amplifying voice and unvoice signals;

f2) calculating Bark Scale non-linear gain;

f3) unwrapping Bark Scale non-linear gain to provide a gain value;

f4) calculating an output spectrum using the gain value and the best combination signals;

f5) performing inverse Fourier transform on the output spectrum and reconstructing time domain signal using an overlapping algorithm; and f6) reconstructing time domain output signal by an inverse wavelet transform.

7. The method in accordance with claim 1, further comprising step g) which comprises the steps:

g1) calculating continuous threshold parameters; and g2) determining whether processed signal from interference and noise suppressor should be processed by a third adaptive whitening filter.

* * * * *